US010592316B2

United States Patent
Li et al.

(10) Patent No.: US 10,592,316 B2
(45) Date of Patent: Mar. 17, 2020

(54) MESSAGE PROCESSING METHOD, APPARATUS, AND SYSTEM

(71) Applicant: Huawei Technologies Co., Ltd., Shenzhen (CN)

(72) Inventors: Fengkai Li, Beijing (CN); Yinben Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 16/010,041

(22) Filed: Jun. 15, 2018

(65) Prior Publication Data
US 2018/0307549 A1 Oct. 25, 2018

Related U.S. Application Data

(63) Continuation of application No. PCT/CN2016/110123, filed on Dec. 15, 2016.

(30) Foreign Application Priority Data

Dec. 16, 2015 (CN) .......................... 2015 1 0947136

(51) Int. Cl.
*G06F 9/54* (2006.01)
*H04L 29/08* (2006.01)
(Continued)

(52) U.S. Cl.
CPC .......... *G06F 9/546* (2013.01); *H04L 41/5041* (2013.01); *H04L 41/5054* (2013.01); *H04L 47/805* (2013.01); *H04L 67/32* (2013.01)

(58) Field of Classification Search
CPC ... H04L 47/805; H04L 67/32; H04L 41/5041; H04L 41/5054; G06F 9/546
See application file for complete search history.

(56) References Cited

U.S. PATENT DOCUMENTS

2007/0249379 A1* 10/2007 Bantukul ................ H04W 4/12
455/466
2013/0044749 A1* 2/2013 Eisner ..................... G06F 9/546
370/392
(Continued)

FOREIGN PATENT DOCUMENTS

CN 101431460 A 5/2009
CN 102739549 A 10/2012
(Continued)

OTHER PUBLICATIONS

Postel "User Datagram Protocol," RFC 768, (Aug. 28, 1980).
(Continued)

*Primary Examiner* — Abdullahi E Salad
(74) *Attorney, Agent, or Firm* — Leydig, Voit & Mayer, Ltd.

(57) ABSTRACT

Embodiments of the present application disclose a message processing method, apparatus, and system, which are applied to SDN. An application sends a first message to a controller, and the message includes service content used to describe a service requirement. The service content includes target information and operation information. The application receives a second message sent by the controller. A payload of the second message includes solution information of at least one solution used to implement the service content. The application obtains the solution information of the at least one solution based on the payload of the second message. Therefore, a service requirement is converted into a control requirement between an application plane and a control plane.

20 Claims, 6 Drawing Sheets

(51) Int. Cl.
*H04L 12/24* (2006.01)
*H04L 12/927* (2013.01)

(56) References Cited

U.S. PATENT DOCUMENTS

| | | | |
|---|---|---|---|
| 2014/0280817 A1 | 9/2014 | Uppalapati et al. | |
| 2015/0127733 A1* | 5/2015 | Ding | H04W 4/08 709/204 |
| 2015/0142906 A1* | 5/2015 | Tolcher | G06Q 20/3255 709/206 |
| 2015/0304209 A1* | 10/2015 | Choudhury | H04L 41/12 370/255 |
| 2017/0300353 A1 | 10/2017 | Yu et al. | |

FOREIGN PATENT DOCUMENTS

| | | |
|---|---|---|
| CN | 103618679 A | 3/2014 |
| CN | 103841044 A | 6/2014 |
| CN | 104253820 A | 12/2014 |
| CN | 104468231 A | 3/2015 |
| CN | 104518902 A | 4/2015 |
| CN | 104518993 A | 4/2015 |
| EP | 2360876 A1 | 8/2011 |
| WO | 2014169289 A1 | 10/2014 |

OTHER PUBLICATIONS

"Transmission Control Protocol DARPA Internet Program Protocol Specification," prepared for Defense Advanced Research Projects Agency Information Processing Techniques Office, by Information Sciences Institute University of Southern California, 4676 Admiralty Way Marina del Rey, California 90291, RFC: 793, (Sep. 1981).
Fielding et al., "Hypertext Transfer Protocol—HTTP/1.1," Network Working Group, rfc2616, Obsoletes: 2068, Category: Standards Track, The Internet Society (Jun. 1999).
Stewart et al., "Stream Control Transmission Protocol," Network Working Group, rfc4960, obsoletes: 2960, 3309, category: standards track, (Sep. 2007).
"SDN Architecture", Open Networking Foundation, XP055475648, pp. 1-68, (Jun. 2014).
Jesus et al.,"ProViNet—An Open Platform for Programmable Virtual Network Management", 2013 IEEE 37th Annual Computer Software and Applications Conference, IEEE, pp. 329-338, XP032517864, Institute of Electrical and Electronics Engineers, New York, New York (Jul. 22, 2013).

* cited by examiner

MESSAGE PROCESSING METHOD, APPARATUS, AND SYSTEM

CROSS-REFERENCE TO RELATED APPLICATIONS

This application is a continuation of International Application No. PCT/CN2016/110123, filed on Dec. 15, 2016, which claims priority to Chinese Patent Application No. 201510947136.8, filed on Dec. 16, 2015. The disclosures of the aforementioned applications are hereby incorporated by reference in their entireties.

TECHNICAL FIELD

The present application relates to the data communication field, and in particular, to a message processing method, apparatus, and system.

BACKGROUND

Software-defined networking (SDN) is a typical network structure. In the SDN, forwarding and control of a network device are separated, to form a forwarding plane and a control plane that are mutually independent. However, a network user, a network application, and the like are on an application plane. For a specific architecture of the SDN, reference may be made to FIG. 1. The application plane interacts with the control plane, and the control plane interacts with the forwarding plane.

As technologies develop, it is expected that network resources and network behavior can be flexibly controlled in the SDN based on a service requirement and characteristics of the planes in the SDN. For example, the application plane may send a service requirement to the control plane, and the control plane determines, based on content carried in the received service requirement, a control requirement for specifically implementing the service requirement in the SDN. It can be understood that the service requirement herein is an abstract description of a network requirement, for example, connectivity, bandwidth, and a service deployment lifecycle, so that the application plane does not need to describe, to the control plane, how to implement these requirements on a network.

It can be learned that how to convert a service requirement into a control requirement between the application plane and the control plane in the SDN is an urgent technical problem to be resolved currently.

SUMMARY

To resolve the foregoing technical problem, embodiments of the present application provide a message processing method, apparatus, and system, so as to convert a service requirement into a control requirement between an application plane and a control plane.

According to a first aspect, an embodiment of the present application provides a message processing method, applied to SDN, and the method includes:

sending, by an application, a first message to a controller, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object;

receiving, by the application, a second message sent by the controller, where the second message includes a message header and a payload, the message header of the second message is used to identify that a message type of the second message is a response message, the payload of the second message includes solution information of at least one solution used to implement the service content, and the solution information includes a solution description of the at least one solution or a solution identifier corresponding to the at least one solution;

identifying, by the application based on the message header of the second message, that the second message is a response message; and obtaining, by the application, the solution information of the at least one solution based on the payload of the second message.

Optionally, the service content further includes constraint information and/or context information, the constraint information of the service content is used to identify a constraint condition for the service content, the context information of the service content is used to identify environment information for the service content, and the environment information includes any one or a combination of an application environment parameter, a network environment parameter, or an application scenario source.

Optionally, the payload of the second message further includes a constraint dimension item and/or a context requirement item, the constraint dimension item is used to request the application to reply with the constraint condition for the service content, and the context requirement item is used to request the application to reply with the environment information for the service content; and the obtaining, by the application, the solution information of the at least one solution based on the payload of the second message includes:

obtaining, by the application based on the payload of the second message, the constraint dimension item and/or the context requirement item included in the second message, and obtaining the solution information of the at least one solution included in the second message.

Optionally, the method further includes:

determining, by the application, first supplementary content based on the constraint dimension item and/or the context requirement item included in the second message; and sending, by the application, a third message to the controller, where the third message includes a message header and a payload, the message header of the third message is used to identify that a message type of the third message is a request message, the payload of the third message includes the first supplementary content, and if the payload of the second message includes the constraint dimension item, the first supplementary content includes a constraint condition required in the constraint dimension item of the second message; and if the payload of the second message includes the context requirement item, the first supplementary content includes environment information required in the context requirement item of the second message.

Optionally, if the payload of the third message does not include the service content, both the third message and the first message carry an object identifier used to identify the target object; or the payload of the third message includes the service content and the first supplementary content.

Optionally, after the sending, by an application, a first message to a controller and before the receiving, by the application, a second message sent by the controller, the method further includes:

receiving, by the application, a fourth message sent by the controller, where the fourth message includes a message header and a payload, the message header of the fourth message is used to identify that a message type of the fourth message is a response message, and the payload of the fourth message includes a constraint dimension item and/or a context requirement item;

identifying, by the application based on the message header of the fourth message, that the fourth message is a response message;

obtaining, by the application based on the payload of the fourth message, the constraint dimension item and/or the context requirement item included in the fourth message;

determining, by the application, second supplementary content based on the constraint dimension item and/or the context requirement item included in the fourth message; and sending, by the application, a fifth message to the controller, where the fifth message includes a message header and a payload, the message header of the fifth message is used to identify that a message type of the fifth message is a request message, the payload of the fifth message includes the second supplementary content, and if the payload of the fourth message includes the constraint dimension item, the second supplementary content includes a constraint condition required in the constraint dimension item of the fourth message; and if the payload of the fourth message includes the context requirement item, the second supplementary content includes environment information required in the context requirement item of the fourth message.

Optionally, if the service content includes the target information and the operation information, the target information is placed in an object field of the payload of the request message, and the operation information is placed in an operation field of the payload of the request message;

if the service content includes the constraint information, the constraint information is placed in a constraint field of the payload of the request message;

if the service content includes the context information, the context information is placed in a context field of the payload of the request message;

if the payload of the request message includes the first supplementary content, the constraint condition required in the constraint dimension item of the second message is placed in a constraint field of the payload of the request message, and the environment information required in the context requirement item of the second message is placed in a context field of the payload of the request message; and if the payload of the request message includes the second supplementary content, the constraint condition required in the constraint dimension item of the fourth message is placed in a constraint field of the payload of the request message, and the environment information required in the context requirement item of the fourth message is placed in a context field of the payload of the request message.

Optionally, after the obtaining, by the application, the solution information of the at least one solution based on the payload of the second message, the method further includes:

sending, by the application, a sixth message to the controller, where the sixth message includes a message header and a payload, the message header of the sixth message is used to identify that a message type of the sixth message is a selection message, and the payload of the sixth message includes a target solution or a solution identifier of the target solution, where the target solution or the solution identifier of the target solution is selected by the application from the solution information of the at least one solution; and receiving, by the application, a seventh message sent by the controller for the sixth message, where the seventh message includes a message header and a payload, the message header of the seventh message is used to identify that a message type of the seventh message is a confirmation message, the payload of the seventh message includes an implementation result of the target solution, and the implementation result is used to identify whether the target solution is implemented.

According to a second aspect, an embodiment of the present application provides a message processing apparatus, applied to SDN, and the apparatus includes:

a sending unit, configured to send a first message to a controller, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object;

a receiving unit, configured to receive a second message sent by the controller, where the second message includes a message header and a payload, the message header of the second message is used to identify that a message type of the second message is a response message, the payload of the second message includes solution information of at least one solution used to implement the service content, and the solution information includes solution description of the at least one solution or a solution identifier corresponding to the at least one solution;

an identification unit, configured to identify, based on the message header of the second message, that the second message is a response message; and an obtaining unit, configured to obtain the solution information of the at least one solution based on the payload of the second message.

Optionally, the service content further includes constraint information and/or context information, the constraint information of the service content is used to identify a constraint condition for the service content, the context information of the service content is used to identify environment information for the service content, and the environment information includes any one or a combination of an application environment parameter, a network environment parameter, or an application scenario source.

Optionally, the payload of the second message further includes a constraint dimension item and/or a context requirement item, the constraint dimension item is used to request the application to reply with the constraint condition for the service content, and the context requirement item is used to request the application to reply with the environment information for the service content; and the obtaining unit is further configured to obtain, based on the payload of the second message, the constraint dimension item and/or the context requirement item included in the second message, and obtain the solution information of the at least one solution included in the second message.

Optionally, the apparatus further includes:

a determining unit, configured to determine first supplementary content based on the constraint dimension item and/or the context requirement item included in the second message; and the sending unit is further configured to send a third message to the controller, where the third message includes a message header and a payload, the message header of the third message is used to identify that a message type of the third message is a request message, the payload of the third message includes the first supplementary content, and if the payload of the second message includes the constraint dimension item, the first supplementary content includes a constraint condition required in the constraint dimension item of the second message; and if the payload of the second message includes the context requirement item, the first supplementary content includes environment information required in the context requirement item of the second message.

Optionally, if the payload of the third message does not include the service content, both the third message and the first message carry an object identifier used to identify the target object; or the payload of the third message includes the service content and the first supplementary content.

Optionally, the receiving unit is further configured to receive a fourth message sent by the controller, where the fourth message includes a message header and a payload, the message header of the fourth message is used to identify that a message type of the fourth message is a response message, and the payload of the fourth message includes a constraint dimension item and/or a context requirement item;

the identification unit is further configured to identify, based on the message header of the fourth message, that the fourth message is a response message;

the obtaining unit is further configured to obtain, based on the payload of the fourth message, the constraint dimension item and/or the context requirement item included in the fourth message;

the determining unit is further configured to determine second supplementary content based on the constraint dimension item and/or the context requirement item included in the fourth message; and the sending unit is further configured to send a fifth message to the controller, where the fifth message includes a message header and a payload, the message header of the fifth message is used to identify that a message type of the fifth message is a request message, the payload of the fifth message includes the second supplementary content, and if the payload of the fourth message includes the constraint dimension item, the second supplementary content includes a constraint condition required in the constraint dimension item of the fourth message; and if the payload of the fourth message includes the context requirement item, the second supplementary content includes environment information required in the context requirement item of the fourth message.

Optionally, if the service content includes the target information and the operation information, the target information is placed in an object field of the payload of the request message, and the operation information is placed in an operation field of the payload of the request message;

if the service content includes the constraint information, the constraint information is placed in a constraint field of the payload of the request message;

if the service content includes the context information, the context information is placed in a context field of the payload of the request message;

if the payload of the request message includes the first supplementary content, the constraint condition required in the constraint dimension item of the second message is placed in a constraint field of the payload of the request message, and the environment information required in the context requirement item of the second message is placed in a context field of the payload of the request message; and if the payload of the request message includes the second supplementary content, the constraint condition required in the constraint dimension item of the fourth message is placed in a constraint field of the payload of the request message, and the environment information required in the context requirement item of the fourth message is placed in a context field of the payload of the request message.

Optionally, the sending unit is further configured to send a sixth message to the controller, where the sixth message includes a message header and a payload, the message header of the sixth message is used to identify that a message type of the sixth message is a selection message, and the payload of the sixth message includes a target solution or a solution identifier of the target solution, where the target solution or the solution identifier of the target solution is selected by the application from the solution information of the at least one solution; and the receiving unit is further configured to receive a seventh message sent by the controller for the sixth message, where the seventh message includes a message header and a payload, the message header of the seventh message is used to identify that a message type of the seventh message is a confirmation message, the payload of the seventh message includes an implementation result of the target solution, and the implementation result is used to identify whether the target solution is implemented.

According to a third aspect, an embodiment of the present application provides a message processing method, applied to SDN, and the method includes:

obtaining, by a controller, a first message sent by an application, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object;

identifying, by the controller based on the message header of the first message, that the first message is a request message;

obtaining, by the controller, the service content based on the payload of the first message;

determining, by the controller based on the service content, at least one solution used to implement the service content; and sending, by the controller, a second message to the application, where the second message includes a message header and a payload, the message header of the second message is used to identify that a message type of the second message is a response message, the payload of the second message includes solution information of the at least one solution, and the solution information includes a solution description of the at least one solution or a solution identifier corresponding to the at least one solution.

Optionally, the service content further includes constraint information and/or context information, the constraint information of the service content is used to identify a constraint condition for the service content, the context information of the service content is used to identify environment information for the service content, and the environment information includes any one or a combination of an application environment parameter, a network environment parameter, or an application scenario source.

Optionally, if the controller cannot determine, based on the service content, all solutions used to implement the service content, the controller determines, based on the service content, to request the application to reply with the constraint condition for the service content and/or the environment information for the service content; and the payload of the second message further includes a constraint dimension item and/or a context requirement item, the constraint dimension item is used to request the application to reply with the constraint condition for the service content, and the context requirement item is used to request the application to reply with the environment information for the service content.

Optionally, after the obtaining, by a controller, a first message sent by an application and before the sending, by the controller, a second message to the application, the method further includes:

obtaining, by the controller, a third message, where the third message includes a message header and a payload, the message header of the third message is used to identify that a message type of the third message is a request message, the payload of the third message includes supplementary content, the supplementary content includes constraint information and/or context information, the constraint information of the supplementary content includes the constraint condition for the service content, and the context information of the supplementary content includes the environment information for the service content;

identifying, by the controller based on the message header of the third message, that the third message is a request message; and obtaining, by the controller, the payload of the third message.

Optionally, if the payload of the third message does not include the service content, both the third message and the first message carry an object identifier used to identify the target object; and the method further includes:

when obtaining the first message, storing, by the controller, the service content and recording the object identifier;

when the controller obtains the third message, extracting, by the controller, the stored service content based on the object identifier carried in the third message; and the determining, by the controller based on the service content, at least one solution used to implement the service content includes:

determining, by the controller based on the service content and the supplementary content, the at least one solution used to implement the service content; or if the payload of the third message further includes the service content, the determining, by the controller based on the service content, at least one solution used to implement the service content includes:

determining, by the controller based on the service content and the supplementary content, the at least one solution used to implement the service content.

Optionally, the method includes: determining, by the controller based on the service content if the controller cannot determine, based on the service content, a solution used to implement the service content, to request the application to reply with the constraint condition for the service content and/or the environment information for the service content; and sending, by the controller, a fourth message to the application, where the fourth message includes a message header and a payload, the message header of the fourth message is used to identify that a message type of the fourth message is a response message, the payload of the fourth message includes a constraint dimension item and/or a context requirement item, the constraint dimension item is used to request the application to reply with the constraint condition for the service content, and the context requirement item is used to request the application to reply with the environment information for the service content.

Optionally, after the obtaining, by a controller, a first message sent by an application and before the sending, by the controller, a fourth message to the application, the method further includes:

obtaining, by the controller, a third message, where the third message includes a message header and a payload, the message header of the third message is used to identify that a message type of the third message is a request message, the payload of the third message includes supplementary content, the supplementary content includes constraint information and/or context information, the constraint information of the supplementary content includes the constraint condition for the service content, and the context message of the supplementary content includes the environment information for the service content;

identifying, by the controller based on the message header of the third message, that the third message is a request message; and obtaining, by the controller, the payload of the third message.

Optionally, if the payload of the third message does not include the service content, both the third message and the first message carry an object identifier used to identify the target object; and the method further includes:

when obtaining the first message, storing, by the controller, the service content and recording the object identifier;

when the controller obtains the third message, extracting, by the controller, the stored service content based on the object identifier carried in the third message; and the determining, by the controller based on the service content if the controller cannot determine, based on the service content, a solution used to implement the service content, to request the application to reply with the constraint condition for the service content and/or the environment information for the service content includes:

if the controller cannot determine, based on the supplementary content and the service content, the solution used to implement the service content, determining, by the controller based on the supplementary content and the service content, to request the application to reply with the constraint condition for the service content and/or the environment information for the service content; or if the payload of the third message further includes the service content, the determining, by the controller based on the service content if the controller cannot determine, based on the service content, a solution used to implement the service content, to request the application to reply with the constraint condition for the service content and/or the environment information for the service content includes:

if the controller cannot determine, based on the supplementary content and the service content, the solution used to implement the service content, determining, by the controller based on the supplementary content and the service content, to request the application to reply with the constraint condition for the service content and/or the environment information for the service content.

Optionally, after the sending, by the controller, a second message to the application, the method further includes:

obtaining, by the controller, a sixth message sent by the application, where the sixth message includes a message header and a payload, the message header of the sixth message is used to identify that a message type of the sixth message is a selection message, and the payload of the sixth message includes a target solution or a solution identifier of the target solution, where the target solution or the solution identifier of the target solution is selected by the application from the solution information of the at least one solution;

identifying, by the controller based on the message header of the sixth message, that the sixth message is a selection message;

determining, by the controller, an implementation result of the target solution based on the payload of the sixth message, where the implementation result is used to identify whether the target solution is implemented; and sending, by the controller, a seventh message to the application for the sixth message, where the seventh message includes a message header and a payload, the message header of the seventh message is used to identify that a message type of the seventh message is a confirmation message, the payload of the seventh message includes the implementation result of the target solution, and the implementation result is used to identify whether the target solution is implemented.

According to a fourth aspect, an embodiment of the present application provides a message processing apparatus, applied to SDN, and the apparatus includes:

a receiving unit, configured to obtain a first message sent by an application, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object;

an identification unit, configured to identify, based on the message header of the first message, that the first message is a request message;

an obtaining unit, configured to obtain the service content based on the payload of the first message;

a determining unit, configured to determine, based on the service content, at least one solution used to implement the service content; and a sending unit, configured to send a second message to the application, where the second message includes a message header and a payload, the message header of the second message is used to identify that a message type of the second message is a response message, the payload of the second message includes solution information of the at least one solution, and the solution information includes a solution description of the at least one solution or a solution identifier corresponding to the at least one solution.

Optionally, the service content further includes constraint information and/or context information, the constraint information of the service content is used to identify a constraint condition for the service content, the context information of the service content is used to identify environment information for the service content, and the environment information includes any one or a combination of an application environment parameter, a network environment parameter, or an application scenario source.

Optionally, if the determining unit cannot determine, based on the service content, all solutions used to implement the service content, the determining unit is further configured to determine, based on the service content, to request the application to reply with the constraint condition for the service content and/or the environment information for the service content; and the payload of the second message further includes a constraint dimension item and/or a context requirement item, the constraint dimension item is used to request the application to reply with the constraint condition for the service content, and the context requirement item is used to request the application to reply with the environment information for the service content.

Optionally, the receiving unit is further configured to obtain a third message, where the third message includes a message header and a payload, the message header of the third message is used to identify that a message type of the third message is a request message, the payload of the third message includes supplementary content, the supplementary content includes constraint information and/or context information, the constraint information of the supplementary content includes the constraint condition for the service content, and the context information of the supplementary content includes the environment information for the service content;

the identification unit is further configured to identify, based on the message header of the third message, that the third message is a request message; and the obtaining unit is further configured to obtain the payload of the third message.

Optionally, if the payload of the third message does not include the service content, both the third message and the first message carry an object identifier used to identify the target object; and the method further includes:

when obtaining the first message, the receiving unit is further configured to store the service content and record the object identifier;

when obtaining the third message, the receiving unit is further configured to extract the stored service content based on the object identifier carried in the third message; and the determining unit is further configured to determine, based on the service content and the supplementary content, the at least one solution used to implement the service content; or if the payload of the third message further includes the service content, the determining unit is further configured to determine, based on the service content and the supplementary content, the at least one solution used to implement the service content.

Optionally, if the determining unit cannot determine, based on the service content, a solution used to implement the service content, the determining unit is further configured to determine, based on the service content, to request the application to reply with the constraint condition for the service content and/or the environment information for the service content; and the sending unit is further configured to send a fourth message to the application, where the fourth message includes a message header and a payload, the message header of the fourth message is used to identify that a message type of the fourth message is a response message, the payload of the fourth message includes a constraint dimension item and/or a context requirement item, the constraint dimension item is used to request the application to reply with the constraint condition for the service content, and the context requirement item is used to request the application to reply with the environment information for the service content.

Optionally, the receiving unit is further configured to obtain a third message, where the third message includes a message header and a payload, the message header of the third message is used to identify that a message type of the third message is a request message, the payload of the third message includes supplementary content, the supplementary content includes constraint information and/or context information, the constraint information of the supplementary content includes the constraint condition for the service content, and the context message of the supplementary content includes the environment information for the service content;

the identification unit is further configured to identify, based on the message header of the third message, that the third message is a request message; and the obtaining unit is further configured to obtain the payload of the third message.

Optionally, if the payload of the third message does not include the service content, both the third message and the first message carry an object identifier used to identify the target object;

when obtaining the first message, the receiving unit is further configured to store the service content and record the object identifier;

when obtaining the third message, the receiving unit is further configured to extract the stored service content based on the object identifier carried in the third message; and if the determining unit cannot determine, based on the service content, the solution used to implement the service content, the determining unit is further configured to determine, based on the supplementary content and the service content, to request the application to reply with the constraint condition for the service content and/or the environment information for the service content; or if the payload of the third message further includes the service content, and if the determining unit cannot determine, based on the service content, the solution used to implement the service content, the determining unit is further configured to determine, based on the supplementary content and the service content, to request the application to reply with the constraint condition for the service content and/or the environment information for the service content.

Optionally, the receiving unit is further configured to obtain a sixth message sent by the application, where the sixth message includes a message header and a payload, the message header of the sixth message is used to identify that a message type of the sixth message is a selection message, and the payload of the sixth message includes a target solution or a solution identifier of the target solution, where the target solution or the solution identifier of the target solution is selected by the application from the solution information of the at least one solution;

the identification unit is further configured to identify, based on the message header of the sixth message, that the sixth message is a selection message;

the determining unit is further configured to determine an implementation result of the target solution based on the payload of the sixth message, where the implementation result is used to identify whether the target solution is implemented; and the sending unit is further configured to send a seventh message to the application for the sixth message, where the seventh message includes a message header and a payload, the message header of the seventh message is used to identify that a message type of the seventh message is a confirmation message, the payload of the seventh message includes the implementation result of the target solution, and the implementation result is used to identify whether the target solution is implemented.

According to a fifth aspect, an embodiment of the present application provides a message processing system, applied to SDN, and the system includes an application and a controller.

The application is configured to: send a first message to the controller, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object; receive a second message sent by the controller, where the second message includes a message header and a payload, the message header of the second message is used to identify that a message type of the second message is a response message, the payload of the second message includes solution information of at least one solution used to implement the service content, and the solution information includes a solution description of the at least one solution or a solution identifier corresponding to the at least one solution; identify, based on the message header of the second message, that the second message is a response message; and obtain the solution information of the at least one solution based on the payload of the second message.

The controller is configured to: obtain the first message sent by the application; identify, based on the message header of the first message, that the first message is a request message; obtain the service content based on the payload of the first message; determine, based on the service content, the at least one solution used to implement the service content; and send the second message to the application.

It can be learned from the foregoing technical solution that, the type of the first message is defined by using the message header of the first message, and the payload of the first message carries the service content used to describe the service requirement, so that an application on the application plane may send, to a controller on the control plane by using the first message, the target object in the service requirement and the operation used to implement the service requirement on the target object. In addition, the type of the second message is defined by using the message header of the second message, and the payload of the second message carries the service content used to describe the service requirement. When receiving the second message sent by the controller, the application may identify and obtain the solution information of at least one solution that is carried in the payload of the second message and that is used to implement the service content, so as to convert the service requirement into the control requirement between the application plane and the control plane.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

Figure 1:
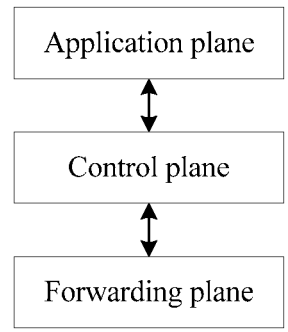
FIG. 1 is a schematic diagram of an SDN architecture.

The following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

As SDN technologies develop, it is expected that network resources and network behavior can be flexibly controlled based on a service requirement and characteristics of planes in SDN finally. In conventional SDN, a forwarding plane and a control plane that are mutually independent in terms of function can be technically and maturely separated, to respectively implement a forwarding function and a control function.

Based on increasing requirements on the SDN, a current focus goes to conversion from a service requirement to a control requirement between an application plane and the control plane. The application plane is expected to focus on only user intent instead of specific implementation details of the user intent in the SDN. To achieve the foregoing objective, the application plane may need to clearly express and reflect the user intent by using an abstract description of the service requirement. Correspondingly, the control plane needs to be capable of understanding a description of a service requirement that is provided by the application plane and that is used to reflect the user intent, and provide a corresponding network implementation, that is, determine a control requirement used for specifically implementing the service requirement in the SDN. It can be learned that how to convert a service requirement into a control requirement between the application plane and the control plane in the SDN is an urgent technical problem to be resolved currently.

To achieve the foregoing objective, the inventor finds that the control plane may provide a northbound interface (NBI), to interact with the application plane. Specifically, the NBI provided for the application plane may be an intent-based northbound interface (Intent-based NBI). The intent-based northbound interface is a highly abstract northbound interface that is used to describe user intent and that is unrelated to specific network implementation details. Based on a function provided by the intent-based NBI, the application plane only needs to abstractly describe a network requirement, such as connectivity, bandwidth, and a service deployment lifecycle. The application plane needs to focus on only user intent, and does not need to describe how to implement the user intent in a network. In addition, the control plane converts, based on the application plane, specific syntax, a semantic description, and compile mapping used in a user requirement into a control requirement on network resources.

It can be learned that, by using the northbound interface, a service requirement can be converted into a control requirement between the application plane and the control plane through an intent negotiation process. In the present application, not only an interaction step and a network interface that may be required between the application plane and the control plane are procedurally defined, but also an intent-based NBI implementation standard is fundamentally defined, so that a service requirement can be actually converted into a control requirement between the application plane and the control plane by using a standard.

Therefore, embodiments of the present application provide a message processing method, apparatus, and system. A type of a first message is defined by using a message header of the first message, and a payload of the first message carries service content used to describe a service requirement, so that an application on an application plane may send, to a controller on a control plane by using the first message, a target object in the service requirement and an operation used to implement the service requirement on the target object. In addition, a type of a second message is defined by using a message header of the second message, and a payload of the second message carries service content used to describe a service requirement. When receiving the second message sent by the controller, the application may identify and obtain at least one solution that is carried in the payload of the second message and that is used to implement the service content, so as to convert the service requirement into a control requirement between the application plane and the control plane.

In the embodiments of the present application, it can be understood that the application is located on the application plane in SDN. The application may be a series of application programs, and the application may be implemented by using any quantity of software components residing on any quantity of physical platforms or virtual platforms. The physical platform may be a physical device such as a physical server. The virtual platform may be a virtual device such as a virtual machine (VM). The software component may be an application process, thread, or the like. The application may be a network application, for example, a bandwidth on demand (BoD) application or an SFC application (a service function chaining technology, Service Function Chaining).

The application may send a network requirement together with expected established network behavior to a network controller in a direct or programming manner by using an abstract interface provided by the network controller. The application usually performs adaptation driving on service logic and one or more different underlying network technologies, to describe a service requirement required by a service. In addition, the controller may control, manage, and configure network resources based on the service requirement described by the application, to meet a network service customization requirement.

Figure 2:
FIG. 2 is a schematic diagram of a packet format of a message according to an embodiment of the present application.

It can be understood that the controller is located on the control plane in the SDN, and is a software entity that can control a network resource set. The controller may be implemented by using any quantity of software components residing on any quantity of physical platforms. The controller may be a network controller, for example, OpenDaylight (a distributed network controller), ONOS (an open network operating system), or Floodlight (an OpenFlow controller). For a specific composition form of a message mentioned in the embodiments of the present application, refer to FIG. 2. FIG. 2 is a schematic diagram of a packet format of a message according to an embodiment of the present application. As shown in FIG. 2, a message includes two parts: a message header and a payload. A message type of the message may be identified by using the message header of the message. The message type may include a request message, a response message, a selection message, and a confirmation message. In an implementation process, different message types may be defined by using different type values, for example, type values shown in Table 1.

TABLE 1

| Message type | Type value (hexadecimal) |
|---|---|
| Request message | 0X01 |
| Response message | 0X02 |
| Selection message | 0X03 |
| Confirmation message | 0X04 |

Therefore, when receiving a message, the application or the controller may identify a type of the message by using a message header of the message.

Content carried in a payload of the message is related to the message type of the message. The following examples are used.

If the message is a request message, the payload of the message may carry service content used to describe a service requirement and/or supplementary content used to supplementarily describe the service requirement. It can be learned that the request message is mainly sent by the application to the controller. A specific user intent is described to the controller by using the content carried in the request message.

If the message is a response message, the payload of the message may carry solution information of at least one solution used to implement the service content and/or content that the application is requested to supplement, and the content requested to be supplemented may be carried by using a constraint dimension item and/or a context requirement item. Specifically, the constraint dimension item is used to request the application to reply with a constraint condition for the service content, and the context requirement item is used to request the application to reply with environment information for the service content.

The solution information of the at least one solution herein may include a specific solution description of the at least one solution. The solution description may include a specific implementation description for the at least one solution. The specific implementation description may include main function features of modules in the at least one solution, a dependency relationship and a logic processing sequence between the modules, a correspondence between each module function and a service requirement, and the like. Alternatively, the solution information of the at least one solution may include a solution identifier corresponding to the at least one solution. It should be noted that, to implement explicit identification, one solution generally has a unique solution identifier. The solution identifier may be in a form of a character string, or may be in another identification form that can uniquely identify of the at least one solution, or may be directly a solution name. When the solution information is the solution identifier, network negotiation needs to be performed between the application and the controller in advance, so that the application can understand, by using the solution identifier, specific content or a general procedure of the identified solution. It can be learned that the response message is mainly sent by the controller to the application. How to implement user intent by using the SDN is displayed to the application by using the content carried in the response message. Generally, the controller does not actively send the response message to the application. The controller pertinently returns a corresponding response message to the application only after receiving a request message sent by the application.

If the message is a selection message, the payload of the message includes a target solution or an identifier of the target solution. The target solution or the identifier of the target solution is selected by the application. It can be learned that the selection message is mainly sent by the application to the controller, and the content carried in the selection message is used to notify the controller of a solution selected by the application.

If the message is a confirmation message, the payload of the message includes an implementation result of the target solution, that is, a result of implementing the target solution by the controller in a network. It can be learned that the confirmation message is mainly sent by the controller to the application, and the content carried in the confirmation message is used to notify the application whether the target solution is implemented in the network. Usually, the controller does not actively send the confirmation message to the application. The controller pertinently returns a corresponding confirmation message to the application only after receiving a selection message sent by the application.

After a correlation between the payload and the message type of the message is described, the following describes in detail content that may be included in the payload. Payloads of different types of messages carry different content. Herein, message types are classified to describe the payloads.

For the payload of the request message:

The payload of the request message may include an object field, an operation field, and a constraint field. The three fields may be considered as a 3-tuple (3-tuple pattern) in the payload, and the fields in the 3-tuple are collectively referred to as service requirement fields. A specific form of the 3-tuple may be: {object, operation, constraint}.

Content in the object field may be used to describe a target object to be operated, managed, or affected in the service requirement. The target object herein is an abstract expression method, and may be a network resource or a user resource.

Content in the operation field may be used to describe an operation required for implementing the service requirement on the target object. The operation herein may be processing, an action, or the like that needs to be performed. The processing or the action may be implemented in a specific condition.

Content in the constraint field may be used to describe the constraint condition for the service content, that is, limitation content, a limitation parameter, and the like that need to be met when the operation used to implement the service requirement is performed on the service content.

For a complex service requirement, the payload of the request message may include one or more 3-tuples. However, in some cases, the three fields in the 3-tuple do not co-exist, and the payload of the request message needs to include only one or two fields.

It should be noted that a same service requirement may have one or more service running environments, or needs to be applied to different application scenarios. Therefore, to clearly describe environment information and background information that are related to the service requirement, the payload of the request message may further include a context field. Content in the context field is used to describe specific environment information and background information that are related to the service requirement. The context field may include any one or a combination of an application environment parameter, a network environment parameter, or an application scenario source. For a complex service requirement, the payload of the request message may include one or more context fields.

For the payload of the response message:

The payload of the response message may include a constraint dimension item, a context requirement item, and solution information of a solution used to implement the service requirement.

Content in the constraint dimension item is used to describe a constraint condition that is optional or mandatory and that further needs to be supplemented by the application when the service requirement (a service requirement whose implementation is requested in the request message) is met. The content in the constraint dimension item may be used to request the application receiving the response message to reply with a corresponding constraint condition. For a complex service requirement, the payload of the response message may include one or more constraint dimension items.

Content in the context requirement item is used to describe environment information that is optionally or mandatorily supplemented by the application when the service requirement (a service requirement whose implementation is requested in the request message) is met. The content in the context requirement item may be used to request the application receiving the response message to reply with corresponding environment information. For a complex service requirement, the payload of the response message may include one or more context requirement items.

The solution information of the solution used to implement the service requirement includes a specific solution description or a solution identifier corresponding to the solution. There is one or more solutions for implementing the service requirement. Therefore, there is one or more pieces of corresponding solution information. By using the solution information of the solution used to implement the service requirement, a method for implementing the service requirement may be displayed to the application receiving the response message.

The following describes a manner of carrying the message. In this embodiment of the present application, the message may be carried in an existing packet format such as a Transmission Control Protocol packet, or may be carried in a customized packet format. The existing packet format may be specifically, for example, the Transmission Control Protocol (TCP) packet, a User Datagram Protocol (UDP) packet, or a Stream Control Transmission Protocol (SCTP) packet.

The message may be generally carried by using a payload of a packet. A format of the message in the packet varies with a message type.

A format of the request message in a packet may be shown in Table 2.

TABLE 2

| Message header | Message length | Service requirement header | Service requirement group | Context field header | Context field |
| --- | --- | --- | --- | --- | --- |

The message header of the request message is used to identify that a message type is a request message.

The message length of the request message is used to identify a byte length of the payload of the request message, so as to determine how many bytes of content following the request message header belong to the payload corresponding to the message header of the request message. The message length of the request message may also be used to identify a sum of byte lengths of the message header and the payload of the request message.

The service requirement header, the service requirement group, the context field header, and the context field all are possible composition parts of the payload of the request message.

The service requirement header may include a service requirement quantity field and a service requirement length field. The service requirement quantity field is used to identify a quantity of 3-tuples in the service requirement group, and the service requirement length field is used to identify a total length of bytes occupied by the service requirement group.

The service requirement group may include an object field, an operation field, and a constraint field. The three fields may have fixed or unfixed byte lengths. When the byte lengths are unfixed, the three fields may have corresponding headers, to identify a start location and a byte length of a corresponding field. In the service requirement group, a flag bit (c_flag) field in the object field may further be used to identify whether the service requirement group includes the constraint field. For example, when the flag bit field is 1, it indicates that the service requirement group includes the constraint field; or when the flag bit field is 0, it indicates that the service requirement group does not include the constraint field.

The context field header may include a context information piece quantity field and a context information length field. The context information piece quantity field may be used to identify a quantity of pieces of context information included in the context field, and the context information length field may be used to identify a total byte length of the context field.

The context field includes context information.

A format of the response message in a packet may be shown in Table 3.

TABLE 3

| Message header | Message length | Context requirement item | Constraint dimension header | Constraint dimension item field | Solution information header of a solution used to implement a service requirement | Solution information field of a solution used to implement a service requirement |
| --- | --- | --- | --- | --- | --- | --- |

The message header of the response message is used to identify that a message type is a response message.

The message length of the response message is used to identify a byte length of the payload of the response message, so as to determine how many bytes of content following the response message header belong to the payload corresponding to the message header of the response message. The message length of the response message may also be used to identify a sum of byte lengths of the message header and the payload of the response message.

The context requirement item flag bit is used to identify whether the response message includes the context requirement item. For example, when the context requirement item flag bit is 1, it may be considered that the response message includes the context requirement item, to request the application to send corresponding context information; or when the context requirement item flag bit is 0, it may be considered that the response message does not include the context requirement item, and the application does not need to send the context information.

The constraint dimension header may include a constraint dimension quantity field and a constraint dimension length field. The constraint dimension quantity field is used to identify a quantity of constraint dimension items included in the constraint dimension item field. The constraint dimension length field is used to identify a total length of bytes occupied by the constraint dimension item field.

A constraint dimension item included in the constraint dimension item field may have a fixed or unfixed byte length. When the byte length is unfixed, the constraint dimension item may further have a corresponding header, to identify a start location and a byte length of the corresponding constraint dimension item.

The solution information header of the solution used to implement the service requirement may include a solution information piece quantity field and a solution information length field. The solution information piece quantity field is used to identify a quantity of specific solutions included in the solution information field of the solution used to implement the service requirement, that is, a quantity of pieces of corresponding solution information. The solution information length field is used to identify a total length of bytes occupied by the solution information field of the solution used to implement the service requirement.

Solution information in the solution information field of the solution used to implement the service requirement may have a fixed or unfixed byte length. When the byte length is unfixed, the solution information may further have a corresponding header, to identify a start location and a byte length of the corresponding solution information.

The following describes an actual process of message interaction between an application plane and a control plane in SDN, so as to describe message processing in the present application by using a specific application scenario.

Figure 3:
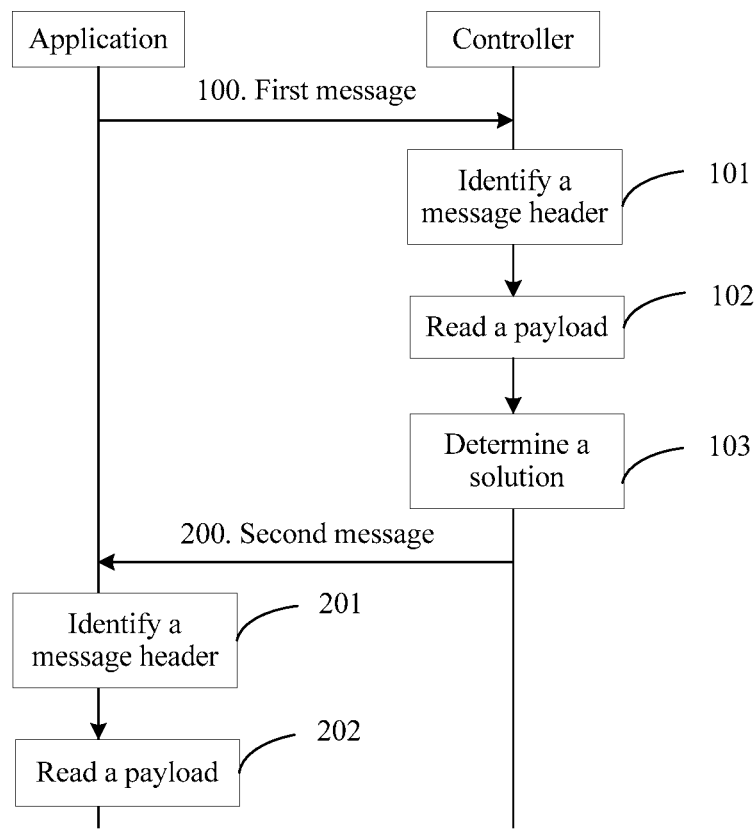
FIG. 3 is a signaling diagram of message interaction between an application plane and a control plane according to an embodiment of the present application.

FIG. 3 is a signaling diagram of message interaction between an application plane and a control plane according to an embodiment of the present application. As shown in FIG. 3, the following steps are included.

100. An application sends a first message to a controller, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object. The processing or action may be implemented in a specific condition.

For example, when a user has an intent to implement some functions in a network, an application may explicitly describe a network requirement, expected established network behavior, and the like in the user intent by using a request message. One request message may describe one or more user intents.

The first message is a request message, and may be understood as a first request message or an initial request message sent by the application to the controller for user intent. The initial request message needs to fully and clearly describe the user intent. The target information and the operation information may be core content, and are mandatory. The target object of the user intent and the operation used to implement the service requirement on the target object need to be described by using the target information and the operation information.

Parts included in the payload of the first message may be used as a part of the service content. For relatively complex user intent, the payload of the first message may further include constraint information and/or context information, to better describe the user intent. The constraint information may be used to identify a constraint condition for the service content, and the context information may be used to identify environment information for the service content. Correspondingly, in addition to the target information and the operation information, the service content may further include the constraint information and/or the context information in the payload of the first message.

If the service content includes the target information and the operation information, the target information may be placed in an object field of the payload of the first message, and the operation information may be placed in an operation field of the payload of the first message. If the service content includes the constraint information, the constraint information may be placed in a constraint field of the payload of the first message. If the service content includes the context information, the context information may be placed in a context field of the payload of the first message.

101. The controller identifies, based on the message header of the first message, that the first message is a request message.

When receiving the first message sent by the application in step 100, the controller may identify, based on the foregoing defined message header function, that the first message is a request message.

102. The controller obtains the service content based on the payload of the first message.

A format of the request message has been described above. When processing the first message, the controller may determine, by using a message length of the request message, how many bytes of content following the message header belong to the payload of the first message, so as to obtain the service content.

After obtaining the service content, the controller may obtain at least three different results based on processing performed on the service content.

In a first result, the service content is sufficient, and the controller can determine all solutions used to implement the service content.

In a second result, the service content is insufficient, and the controller can determine some solutions used to implement the service content or a solution used to implement partial service content. However, for partial content or some solutions of the service content, the controller cannot determine an implementable solution based on the currently obtained service content. Therefore, the controller may determine content that needs to be supplemented by the application, for example, determine to request the application to reply with the constraint condition for the service content and the environment information for the service content.

In a third result, the service content is insufficient, and the controller cannot determine an implementable solution based on the currently obtained service content. To obtain a solution that can implement the user intent, the controller needs to determine content that needs to be supplemented by the application.

The embodiment corresponding to FIG. 3 mainly describes how the controller interacts with the application when the first result and the second result in the foregoing three results occur, that is, when a solution used to implement the service content is determined. For details, refer to content and a description in step 103 and step 104.

103. The controller determines, based on the service content, at least one solution used to implement the service content.

When the first result occurs, the controller may determine at least one solution used to implement the service content. It can be understood that the at least one solution herein is all solutions used to implement the service content. When the second result occurs, it can be understood that the at least one solution determined by the controller is some solutions used to implement the service content, or a solution used to implement partial service content. In addition, to obtain a remaining solution that may be determined for the service content, the controller may further determine content that needs to be supplemented by the application.

200. The controller sends a second message to the application, where the second message includes a message header and a payload, the message header of the second message is used to identify that a message type of the second message is a response message, the payload of the second message includes solution information of the at least one solution, and the solution information includes a solution description of the at least one solution or a solution identifier corresponding to the at least one solution.

For example, the second message is a response message including solution information, and a format of the second message may also be shown in Table 3. When the first result occurs, the second message does not include a context requirement item (for example, when a context requirement item flag bit is 0, it is equivalent to that the context requirement item is excluded), a constraint dimension header, or a constraint dimension item field.

When the second result occurs, the controller may add, to a corresponding location in the payload of the second message, the determined content that needs to be supplemented by the application. For example, content that is used to request to application to reply with the constraint condition for the service content is used as a constraint dimension item, and added to a constraint dimension item field in the payload of the second message. A context requirement item flag bit in the payload of the second message is set to 1, and the like.

It should be noted that, for the at least one solution, although sending a complete solution (for example, all procedures of a solution) to the application may help a user who uses the application understand the solution clearly, transmitting the complete solution may consume a relatively large quantity of network resources. In some application scenarios with insufficient network resources, transmitting the complete solution may cause relatively large network load. Therefore, for different application scenarios and requirements, the at least one solution may be sent to the application in different forms by using the second message. In this embodiment of the present application, the payload of the second message is the solution information of the at least one solution. When network resources are sufficient, the complete solution, that is, a specific solution description of the at least one solution may be used as the solution information of the at least one solution. When network resources are insufficient, the solution identifier corresponding to the at least one solution may be used as the solution information of the at least one solution. In these two possible implementations of the solution information, the controller may store the at least one solution and/or a correspondence between the at least one solution and the solution identifier at a controller end for subsequent invoking.

201. The application identifies, based on the message header of the second message, that the second message is a response message.

When receiving the second message sent by the controller in step 200, the application may identify, based on the foregoing defined message header function, that the second message is a response message.

202. The application obtains the solution information of the at least one solution based on the payload of the second message.

A format of the response message has been described above. When processing the second message, the application may determine, by using a message length of the response message, how many bytes of content following the response message header belong to the payload of the second message, so as to obtain the solution information of the at least one solution in the payload of the second message.

It should be noted that, if the payload of the second message further includes the constraint dimension item and/or the context requirement item, the application may obtain, in addition to the at least one solution and based on the payload of the second message, the constraint dimension item and/or the context requirement item included in the second message.

After the application obtains the solution information of the at least one solution, there may be at least two processing manners.

In a first processing manner, a user is relatively satisfied with the solution information of the at least one solution provided by the controller. At least one target solution can meet a user requirement. That is, the user may select a target solution or an identifier of the target solution from the solution information of the at least one solution.

The first processing manner may be corresponding to the foregoing first result or second result. That is, when the payload of the second message includes only the solution information of the at least one solution, the application may implement the first processing manner. When the payload of the second message not only includes the solution information of the at least one solution, but also includes the constraint dimension item and/or the context requirement item, the application may implement the first processing manner.

In a second processing manner, a user is unsatisfied with the solution information of the at least one solution provided by the controller, and a user requirement cannot be met. The user is more inclined to supplement content based on the constraint dimension item and/or the context requirement item in the second message.

When the payload of the second message includes only the solution information of the at least one solution, the controller provides all solutions that can implement the user intent, and there is no need to supplement content to the controller. Therefore, the second processing manner is mainly corresponding to the foregoing second result. That is, when the payload of the second message not only includes the solution information of the at least one solution, but also includes the constraint dimension item and/or the context requirement item, the application may implement the second processing manner.

Figure 4:
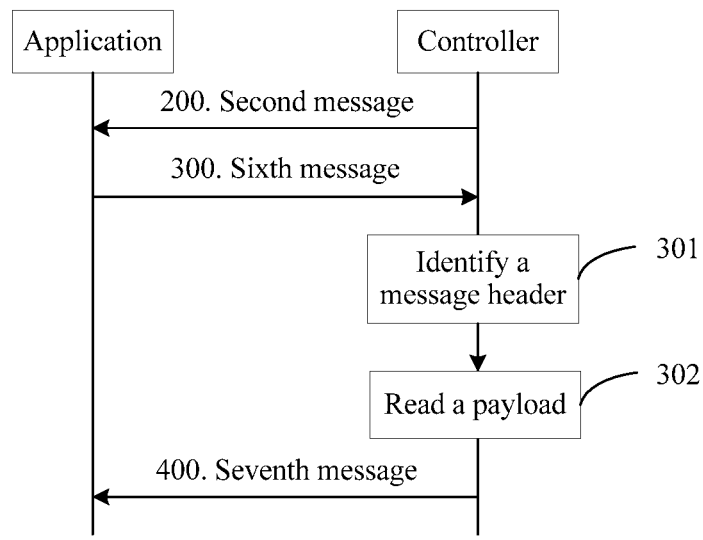
FIG. 4 is another signaling diagram of message interaction between an application plane and a control plane according to an embodiment of the present application.

For the first processing manner, based on the embodiment corresponding to FIG. 3, FIG. 4 is another signaling diagram of message interaction between an application plane and a control plane according to an embodiment of the present application. As shown in FIG. 4, the following steps are included.

200. The controller sends a second message to the application.

After receiving the second message, the application further identifies and reads the payload, and details are not described herein again.

300. The application sends a sixth message to the controller, where the sixth message includes a message header and a payload, the message header of the sixth message is used to identify that a message type of the sixth message is a selection message, and the payload of the sixth message includes a target solution or a solution identifier of the target solution, where the target solution or the solution identifier of the target solution is selected by the application from the solution information of the at least one solution.

For example, when determining the target solution from the at least one solution, a user needs to notify the controller of a selection result by using the application. The sixth message is a selection message, and may carry the selection result by using the payload of the sixth message, so as to notify the controller.

If the solution information of the at least one solution obtained by the application in step 200 specifically includes the solution description of the at least one solution, the selected target solution may be used as the selection result, and directly added to the payload of the sixth message; or the solution identifier of the target solution may be used as the selection result, and added to the payload of the sixth message.

If the solution information of the at least one solution obtained by the application in step 200 specifically includes the solution identifier corresponding to the at least one solution, the solution identifier of the target solution may be used as the selection result, and added to the payload of the sixth message.

301. The controller identifies, based on the message header of the sixth message, that the sixth message is a selection message.

302. The controller determines an implementation result of the target solution based on the payload of the sixth message, where the implementation result is used to identify whether the target solution is implemented.

For example, the controller determines, by using the sixth message, a target solution selected by the user, performs implementation based on the target solution, and identifies, by using the implementation result, whether the target solution is implemented.

If the controller obtains the solution identifier of the target solution based on the payload of the sixth message, the controller may determine the target solution by using a pre-stored correspondence between a solution and a solution identifier.

400. The controller sends a seventh message to the application for the sixth message, where the seventh message includes a message header and a payload, the message header of the seventh message is used to identify that a message type of the seventh message is a confirmation message, and the payload of the seventh message includes the implementation result of the target solution.

For example, when the controller determines the implementation result of the target solution, the controller needs to notify the application of the implementation result, so as to clarify, to the user, whether the target solution is implemented. The seventh message is a confirmation message. The controller may use the payload of the seventh message to carry the implementation result of the target solution, so as to notify the application.

Figure 5:
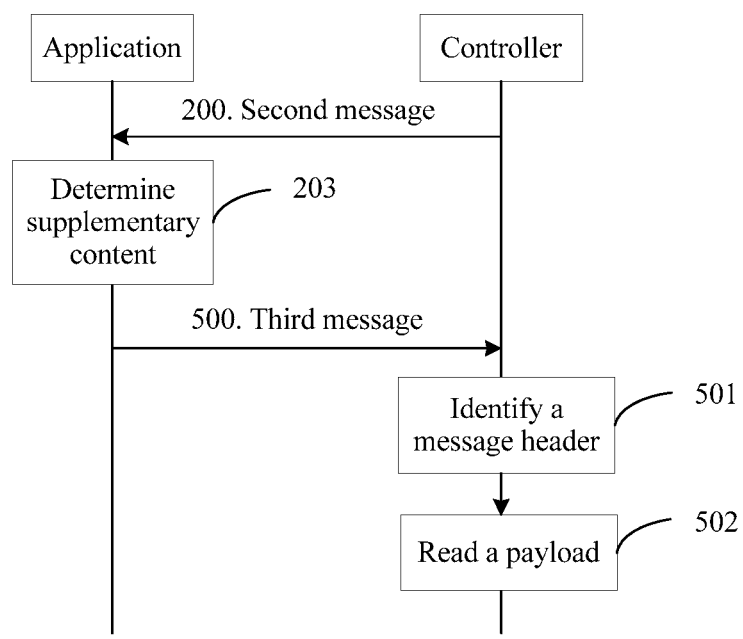
FIG. 5 is still another signaling diagram of message interaction between an application plane and a control plane according to an embodiment of the present application.

For the second processing manner, based on the embodiment corresponding to FIG. 3, FIG. 5 is still another signaling diagram of message interaction between an application plane and a control plane according to an embodiment of the present application. As shown in FIG. 5, the following steps are included.

200. The controller sends a second message to the application.

After receiving the second message, the application further identifies and reads the payload, and details are not described herein again.

203. The application determines first supplementary content based on the constraint dimension item and/or the context requirement item included in the second message.

For example, the first supplementary content is related to content that the controller requests, by using the second message, the application to provide. If the second message includes the constraint dimension item, the first supplementary content includes a constraint condition required in the constraint dimension item of the second message. If the second message includes the context requirement item, the first supplementary content includes environment information required in the context requirement item of the second message.

500. The application sends a third message to the controller, where the third message includes a message header and a payload, the message header of the third message is used to identify that a message type of the third message is a request message, and the payload of the third message includes the first supplementary content. If the payload of the second message includes the constraint dimension item, the first supplementary content includes the constraint condition required in the constraint dimension item of the second message; and if the payload of the second message includes the context requirement item, the first supplementary content includes the environment information required in the context requirement item of the second message.

For example, the third message is a request message, and the request message is returned based on a request in a response message including solution information.

If the payload of the second message includes the constraint dimension item, and the third message includes a constraint field, the constraint condition required in the constraint dimension item of the second message may be placed in the constraint field of the payload of the third message.

If the payload of the second message includes the context requirement item, the third message includes a context field, and the environment information required in the context requirement item of the second message may be placed in the context field of the payload of the third message.

In addition to the first supplementary content, the third message may further carry the service content originally included in the payload of the first message. Therefore, the controller may determine, based on the service content and the first supplementary content, a solution used to implement the service content. If the service content includes the target information and the operation information, the target information may be placed in an object field of the payload of the third message, and the operation information may be placed in an operation field of the payload of the third message. If the service content includes the constraint information, the constraint information may be placed in the constraint field of the payload of the third message. If the service content includes the context information, the context information may be placed in the context field of the payload of the third message.

It should be noted that, because the third message is a request message sent to the controller after the first message, the controller has obtained the service content by using the first message, for example, the target information and the operation information. To save network resources, negotiation may be performed in advance, so that when sending the third message, the application may exclude, in the third message, the service content originally included in the payload of the first message.

To implement an effect of excluding the service content in the third message, negotiation may be performed in advance, so that when sending the first message and the third message, the application may include a same identifier in both the messages. Optionally, in this embodiment of the present application, if the application does not expect to include the service content in the third message, the application may include the same identifier in the first message and the third message, for example, an object identifier used to identify the target object. It should be noted that the object identifier herein may be the same as or different from content that is in the target information of the service content and that is used to identify the target object. The object identifier may be carried by using the object field of the third message, or may be carried in another location of the third message. The present application imposes no limitation thereto.

Negotiation may be performed in advance, so that when receiving the first message, the controller may store the service content and record the object identifier. In this way, when receiving the third message that carries only the first supplementary content, the controller may invoke, based on the object identifier carried in the third message, the previously stored service object, and then determine, with reference to the first supplementary content in the third message, the solution used to implement the service content.

501. The controller identifies, based on the message header of the third message, that the third message is a request message.

502. The controller obtains the payload of the third message.

Processing performed by the controller varies with content carried in the payload of the third message.

If the third message carries only the first supplementary content, the controller may invoke, based on the object identifier, the service content corresponding to the object identifier, and determine, with reference to the first supplementary content in the third message, the solution used to implement the service content.

If the third message carries the service content and the first supplementary content, the controller may not store the service content when receiving the first message, so as to correspondingly reduce storage pressure of the controller. The controller determines, based on the service content and the first supplementary content that are obtained from the payload of the third message, the solution used to implement the service content.

It should be noted that the first supplementary content may not meet a requirement of the controller. For example, the application sends wrong supplementary content, or sends insufficient supplementary content. Consequently, the controller cannot determine a new solution. Therefore, the controller may determine, based on the first supplementary content and the service content, to request the application to reply with the constraint condition for the service content and/or the environment information for the service content. Then, the controller may send a response message to the application again, so as to instruct the application to continue to provide corresponding supplementary content, until the application provides supplementary content required by the controller, or until the application selects the target solution. In this stage, the response message sent by the controller to the application may be the second message that carries a solution, or may be a response message that does not carry a solution, but carries a constraint dimension item and/or a context requirement item. For a description of the response message that does not carry the solution, but carries the constraint dimension item and/or the context requirement item, refer to an embodiment corresponding to FIG. 6.

The following describes the third result described in step 102 in the embodiment corresponding to FIG. 3. In the third case, the service content is insufficient, and the controller cannot determine an implementable solution based on the currently obtained service content. To obtain a solution that can implement the user intent, the controller needs to determine content that needs to be further supplemented by the application.

Figure 6:
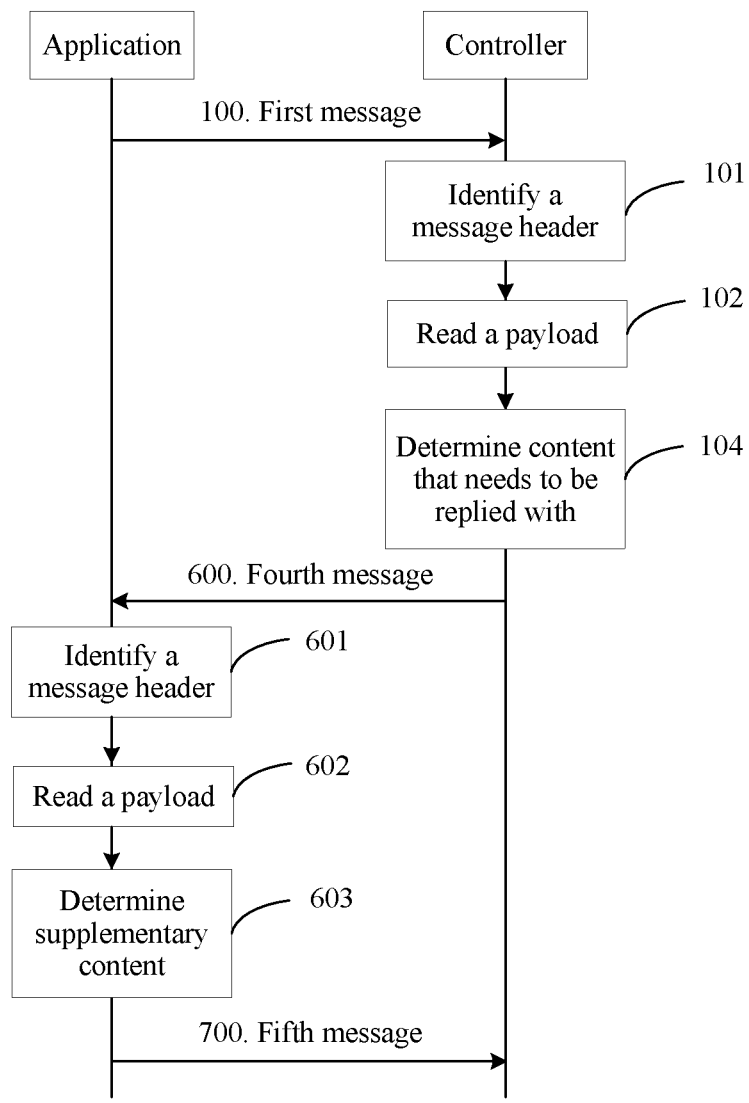
FIG. 6 is yet another signaling diagram of message interaction between an application plane and a control plane according to an embodiment of the present application.

Based on the embodiment corresponding to FIG. 3, FIG. 6 is yet another signaling diagram of message interaction between an application plane and a control plane according to an embodiment of the present application. As shown in FIG. 6, the following steps are included.

100. The application sends the first message to a controller.

101. The controller identifies, based on the message header of the first message, that the first message is a request message.

102. The controller obtains the service content based on the payload of the first message.

104. If the controller cannot determine, based on the service content, a solution used to implement the service content, the controller determines, based on the service content, to request the application to reply with the constraint condition for the service content and/or the environment information for the service content.

For example, step 104 is mainly an operation performed when a processing result of step 102 is the foregoing third result, that is, an operation performed when the controller cannot determine an implementable solution based on the currently obtained service content.

600. The controller sends a fourth message to the application, where the fourth message includes a message header and a payload, the message header of the fourth message is used to identify that a message type of the fourth message is a response message, the payload of the fourth message includes a constraint dimension item and/or a context requirement item, the constraint dimension item is used to request the application to reply with the constraint condition for the service content, and the context requirement item is used to request the application to reply with the environment information for the service content.

For example, the fourth message is a response message that does not include solution information. The controller may add, to a corresponding location in the payload of the fourth message, determined content that needs to be supplemented by the application.

601. The application identifies, based on the message header of the fourth message, that the fourth message is a response message.

602. The application obtains, based on the payload of the fourth message, the constraint dimension item and/or the context requirement item included in the fourth message.

603. The application determines second supplementary content based on the constraint dimension item and/or the context requirement item included in the fourth message.

700. The application sends a fifth message to the controller, where the fifth message includes a message header and a payload, the message header of the fifth message is used to identify that a message type of the fifth message is a request message, and the payload of the fifth message includes the second supplementary content. If the payload of the fourth message includes the constraint dimension item, the second supplementary content includes a constraint condition required in the constraint dimension item of the fourth message; and if the payload of the fourth message includes the context requirement item, the second supplementary content includes environment information required in the context requirement item of the fourth message.

For example, the fifth message is a request message, and the request message is returned based on a request in the response message that does not include the solution information.

If the payload of the fourth message includes the constraint dimension item, the fifth message includes a constraint field, and the constraint condition required in the constraint dimension item of the fourth message may be placed in the constraint field of the payload of the fifth message.

If the payload of the fourth message includes the context requirement item, the fifth message includes a context field, and the environment information required in the context requirement item of the fourth message may be placed in the context field of the payload of the fifth message. In addition to the second supplementary content, the fifth message may further carry the service content originally included in the payload of the first message. Therefore, the controller may determine, based on the service content and the second supplementary content, the solution used to implement the service content. If the service content includes the target information and the operation information, the target information may be placed in an object field of the payload of the fifth message, and the operation information may be placed in an operation field of the payload of the fifth message. If the service content includes the constraint information, the constraint information may be placed in the constraint field of the payload of the fifth message. If the service content includes the context information, the context information may be placed in the context field of the payload of the fifth message.

It should be noted that, because the fifth message is a request message sent to the controller after the first message, the controller has obtained the service content by using the first message, for example, content in the target information and the operation information. To save network resources, negotiation may be performed in advance, so that when sending the fifth message, the application may exclude, in the fifth message, the service content originally included in the payload of the first message. A specific implementation procedure for the fifth message is similar to an implementation procedure for the third message, and details are not described herein again.

After the application sends the fifth message to the controller, the second supplementary content may not meet a requirement of the controller, and consequently, the controller cannot determine an implementable solution. Therefore, the controller may determine, based on the second supplementary content and the service content, to request the application to reply with the constraint condition for the service content and/or the environment information for the service content. Then, the controller may send a response message to the application again, so as to instruct the application to continue to provide corresponding supplementary content, until the application provides supplementary content required by the controller, or until the application selects the target solution. In this stage, the response message sent by the controller to the application may be the second message that carries a solution, or may be the fourth message that does not carry a solution, but carries only the constraint dimension item and/or the context requirement item.

Figure 7:
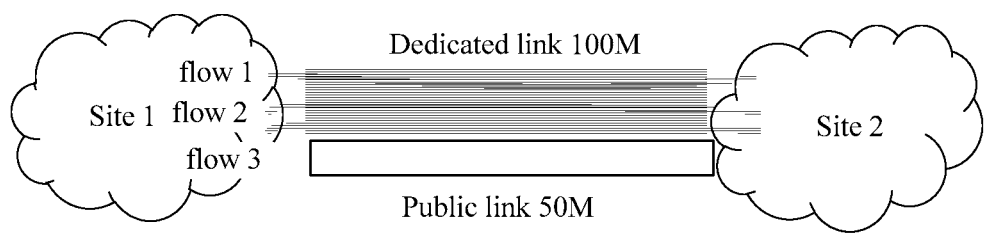
FIG. 7 is a schematic diagram of an application scenario according to an embodiment of the present application.

The following describes the solution of the present application by using a specific application scenario. FIG. 7 is a schematic diagram of an application scenario according to an embodiment of the present application. As shown in FIG. 7, a site 1 and a site 2 may be two sites of an enterprise A, and there are a plurality of service flows between the two sites: f1, f2, and f3.

User intent of the enterprise A is to implement the following service requirement scenarios:

1. There is one dedicated link of 100 M bandwidth between the site 1 and the site 2, and both the site 1 and the site 2 can simultaneously use a public bandwidth link resource.

2. Service flows between the site 1 and the site 2 are classified into a high-priority service flow and a low-priority service flow based on importance.

3. Bandwidth utilization of the dedicated link of 100 M bandwidth between the site 1 and the site 2 cannot be greater than 80%. When the bandwidth utilization is greater than 80%, a service flow in the dedicated link needs to be adjusted to the public bandwidth link, a service flow of high importance is not adjusted to the public bandwidth link, and a service flow of low importance is adjusted to the public bandwidth link.

4. A service flow in the dedicated link between the site 1 and the site 2 guarantees, based on a context requirement of the service flow, different quality of service (QoS) priorities for bandwidth, such as a gold medal, a silver medal, and a bronze medal.

For the user intent, the following may be determined:

A target object is specifically:

C1 that is specified as a dedicated bandwidth link, C2 that is specified as a public bandwidth link, parameters of f1, f2, and f3, and priorities of the three service flows, where H1 is a lower priority, and H2 is a higher priority.

Therefore, content of target information in service content may be shown as follows:

Connection C1 Endnodes(Site1, Site2) Prosperities 100 M

Connection C2 Endnodes(Site1, Site2) Prosperities 50 M

Flow f1 Match src-ip:"160.1.1.0/24", dst-ip:"10.1.0.3/24" Priority:"H1"

Flow f2 Match src-ip:"160.2.1.0/24", dst-ip:"10.2.0.3/24" Priority:"H2"

Flow f3 Match src-ip:"160.3.1.0/24", dst-ip:"10.3.0.3/24" Priority:"H2"

An operation used to implement the service requirement on the target object is specifically:

performing service flow migration when the link bandwidth utilization is greater than 80%.

Therefore, content of operation information of the service content may be shown as follows:

Operation op1 Action move f1, f2, f3 Condition c1.utilization >80% op1 is an operation.

Constraint information is specifically:

migrating a service flow of the priority H2 during service migration.

Therefore, content of the constraint information of the service content may be shown as follows:

Constraint=exclude (flow with Priority H2)

Context information is specifically as follows:

f1 is used for File Transfer Protocol data transmission, f2 is used for backup data transmission, and f3 is used for video transmission.

Therefore, content of the context information of the service content may be shown as follows:

Context: "ftp-data"

Context: "data-backup"

Context: "video"

An application sends, to a controller, a first message including the service content that reflects the user intent. The controller obtains the service content from a payload of the first message. The service content includes the content in each of the target information, the operation information, the constraint information, and the context information. The first message may carry the target information by using an object field in the payload, carry the operation information by using an operation field, carry the constraint information by using a constraint field, and carry the context information by using a context field.

The controller determines, based on the service content, a solution used to implement the service content. A solution determining process and specific solution content may be as follows:

A link connection resource is established for bandwidth guarantee. To meet a connectivity requirement of the bandwidth guarantee, two traffic engineering (TE) tunnels TE1 and TE2 are established on an original fundamental bandwidth link between the two sites based on an implementation technology of a network that actually carries the service requirement, so as to separately ensure 100 M bandwidth and 50 M bandwidth.

Context content of the three service flows in the service content is analyzed. The three service flows are separately used for FTP data transmission, data backup, and online video conferencing. For a data backup service and an online video conferencing service that have a same priority, the online video conferencing is more sensitive to bandwidth. In this case, gold medal QoS bandwidth guarantee is performed on the service flow f3, and silver medal QoS bandwidth guarantee is performed on the service flow f2 for data backup.

In a service flow forwarding process, if the bandwidth utilization of the dedicated bandwidth link is greater than 80%, a service flow is adjusted, and a constraint condition described by op1 is met.

The controller may send the determined solution to the application by using a second message, so as to convert the service requirement into a control requirement between an application plane and a control plane.

The following describes the solution of the present application by using another specific application scenario.

In the application scenario, user intent is specifically as follows:

A Hypertext Transfer Protocol (HTTP) access packet between a site 1 and a site 2 needs to be logged. Logging needs to be performed according to a specific log format, to log a uniform resource identifier (URI) in each HTTP packet.

For the user intent, the following may be determined:

A target object is specifically:

an HTTP service flow f1 between the site 1 and the site 2.

Therefore, content of target information of service content may be shown as follows:

Flow f1 Match src-ip:"160.1.1.0/24", dst-ip:"10.1.0.3/24", dst-port:"8080"

An operation used to implement the service requirement on the target object is specifically:

continuing performing URI log processing.

Therefore, content of operation information of the service content may be shown as follows:

Operation op1 Action uri-logging f1

Context information is specifically:

URI logging of the HTTP packet.

Therefore, content of the context information of the service content may be shown as follows:

Context: "http-uri-logging"

An application sends, to a controller, a first message including the service content that reflects the user intent. The controller obtains the service content from a payload of the first message. The service content includes the content in each of the target information, the operation information, and the context information. The first message may carry the target information by using an object field in the payload, carry the operation information by using an operation field in the payload, and carry the context information by using a context field in the payload.

The controller determines, based on the service content, a solution used to implement the service content. A solution for implementing URI logging of the HTTP packet requires two steps, and specific content is as follows:

Step 1: Perform classification and deep packet inspection (DPI) on a service flow data packet, to obtain a URI of an HTTP packet.

Step 2: Perform log processing.

Sequential processing of two different service functions is required.

A solution description of this solution may be shown as follows:

Solution s1 1st DPI: "packet filtering and de-capsulation", 2nd LOG: "logging"

A solution identifier corresponding to the solution may be: service-catalog-5.2.

A processing step and the solution identifier of the solution may be pre-stored in a user manual or a service customization portal.

The controller may add solution information of the solution to a payload of a second message in two forms, and which form is used may be preset. In a first form, the solution description of the solution is added to the payload of the second message. In a second form, only the solution identifier corresponding to the solution is added to the payload of the second message. In the second form, after receiving the solution identifier service-catalog-5.2, the application may uniquely determine, based on the solution identifier, the specific solution description of the solution.

It can be learned that, a type of the first message is defined by using a message header of the first message, and the payload of the first message carries the service content used to describe the service requirement, so that the application on the application plane may send, to the controller on the control plane by using the first message, the target object in the service requirement and the operation used to implement the service requirement on the target object. In addition, a type of the second message is defined by using a message header of the second message, and the payload of the second message carries the service content used to describe the service requirement. When receiving the second message sent by the controller, the application may identify and obtain solution information of at least one solution that is carried in the payload of the second message and that is used to implement the service content, so as to convert the service requirement into a control requirement between the application plane and the control plane.

Figure 8:
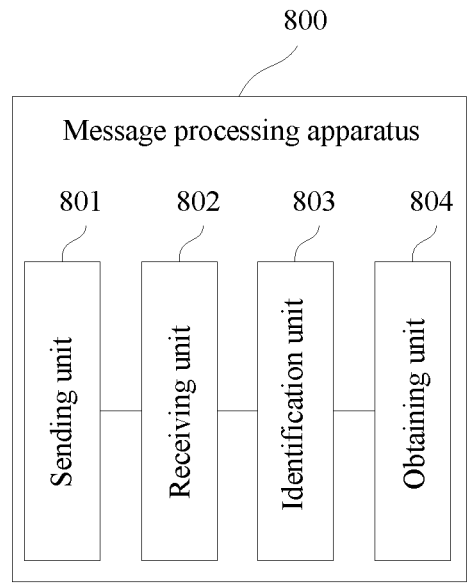
FIG. 8 is a structural diagram of a message processing apparatus according to an embodiment of the present application.

FIG. 8 is a structural diagram of a message processing apparatus 800 according to an embodiment of the present application. The message processing apparatus 800 is applied to SDN, and includes:

a sending unit 801, configured to send a first message to a controller, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object;

a receiving unit 802, configured to receive a second message sent by the controller, where the second message includes a message header and a payload, the message header of the second message is used to identify that a message type of the second message is a response message, the payload of the second message includes solution information of at least one solution used to implement the service content, and the solution information includes solution description of the at least one solution or a solution identifier corresponding to the at least one solution;

an identification unit 803, configured to identify, based on the message header of the second message, that the second message is a response message; and an obtaining unit 804, configured to obtain the solution information of the at least one solution based on the payload of the second message.

Optionally, the service content further includes constraint information and/or context information, the constraint information of the service content is used to identify a constraint condition for the service content, the context information of the service content is used to identify environment information for the service content, and the environment information includes any one or a combination of an application environment parameter, a network environment parameter, or an application scenario source.

Optionally, the payload of the second message further includes a constraint dimension item and/or a context requirement item, the constraint dimension item is used to request the application to reply with the constraint condition for the service content, and the context requirement item is used to request the application to reply with the environment information for the service content; and the obtaining unit is further configured to obtain, based on the payload of the second message, the constraint dimension item and/or the context requirement item included in the second message, and obtain the solution information of the at least one solution included in the second message.

Optionally, the apparatus further includes:

a determining unit, configured to determine first supplementary content based on the constraint dimension item and/or the context requirement item included in the second message; and the sending unit is further configured to send a third message to the controller, where the third message includes a message header and a payload, the message header of the third message is used to identify that a message type of the third message is a request message, the payload of the third message includes the first supplementary content, and if the payload of the second message includes the constraint dimension item, the first supplementary content includes a constraint condition required in the constraint dimension item of the second message; and if the payload of the second message includes the context requirement item, the first supplementary content includes environment information required in the context requirement item of the second message.

Optionally, if the payload of the third message does not include the service content, both the third message and the first message carry an object identifier used to identify the target object; or the payload of the third message includes the service content and the first supplementary content.

Optionally, the receiving unit is further configured to receive a fourth message sent by the controller, where the fourth message includes a message header and a payload, the message header of the fourth message is used to identify that a message type of the fourth message is a response message, and the payload of the fourth message includes a constraint dimension item and/or a context requirement item;

the identification unit is further configured to identify, based on the message header of the fourth message, that the fourth message is a response message;

the obtaining unit is further configured to obtain, based on the payload of the fourth message, the constraint dimension item and/or the context requirement item included in the fourth message;

the determining unit is further configured to determine second supplementary content based on the constraint dimension item and/or the context requirement item included in the fourth message; and the sending unit is further configured to send a fifth message to the controller, where the fifth message includes a message header and a payload, the message header of the fifth message is used to identify that a message type of the fifth message is a request message, the payload of the fifth message includes the second supplementary content, and if the payload of the fourth message includes the constraint dimension item, the second supplementary content includes a constraint condition required in the constraint dimension item of the fourth message; and if the payload of the fourth message includes the context requirement item, the second supplementary content includes environment information required in the context requirement item of the fourth message.

Optionally, if the service content includes the target information and the operation information, the target information is placed in an object field of the payload of the request message, and the operation information is placed in an operation field of the payload of the request message;

if the service content includes the constraint information, the constraint information is placed in a constraint field of the payload of the request message;

if the service content includes the context information, the context information is placed in a context field of the payload of the request message;

if the payload of the request message includes the first supplementary content, the constraint condition required in the constraint dimension item of the second message is placed in the constraint field of the payload of the request message, and the environment information required in the context requirement item of the second message is placed in a context field of the payload of the request message; and if the payload of the request message includes the second supplementary content, the constraint condition required in the constraint dimension item of the fourth message is placed in a constraint field of the payload of the request message, and the environment information required in the context requirement item of the fourth message is placed in a context field of the payload of the request message.

Optionally, the sending unit is further configured to send a sixth message to the controller, where the sixth message includes a message header and a payload, the message header of the sixth message is used to identify that a message type of the sixth message is a selection message, and the payload of the sixth message includes a target solution or a solution identifier of the target solution, where the target solution or the solution identifier of the target solution is selected by the application from the solution information of the at least one solution, or a solution identifier of the target solution; and the receiving unit is further configured to receive a seventh message sent by the controller for the sixth message, where the seventh message includes a message header and a payload, the message header of the seventh message is used to identify that a message type of the seventh message is a confirmation message, the payload of the seventh message includes an implementation result of the target solution, and the implementation result is used to identify whether the target solution is implemented.

It can be learned that, the type of the first message is defined by using the message header of the first message, and the payload of the first message carries the service content used to describe the service requirement, so that the application on an application plane may send, to the controller on a control plane by using the first message, the target object in the service requirement and the operation used to implement the service requirement on the target object. In addition, the type of the second message is defined by using the message header of the second message, and the payload of the second message carries the service content used to describe the service requirement. When receiving the second message sent by the controller, the application may identify and obtain the solution information of the at least one solution that is carried in the payload of the second message and that is used to implement the service content, so as to convert the service requirement into a control requirement between the application plane and the control plane.

Figure 9:
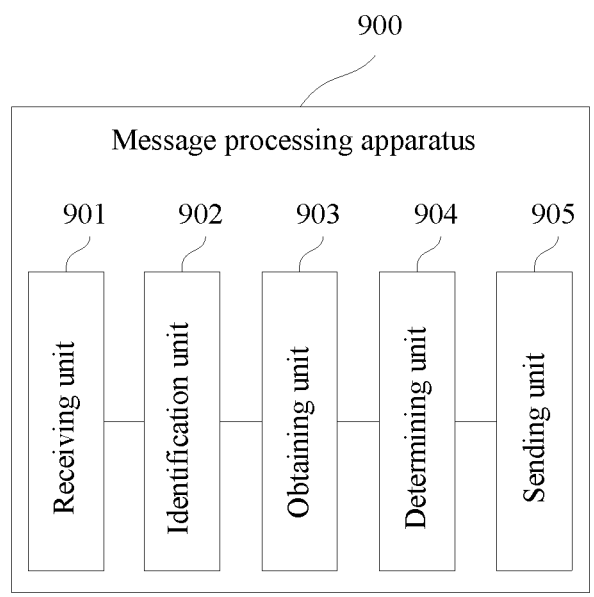
FIG. 9 is a structural diagram of a message processing apparatus according to an embodiment of the present application.

FIG. 9 is a structural diagram of a message processing apparatus 900 according to an embodiment of the present application. The message processing apparatus 900 is applied to SDN, and includes:

a receiving unit 901, configured to obtain a first message sent by an application, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object;

an identification unit 902, configured to identify, based on the message header of the first message, that the first message is a request message;

an obtaining unit 903, configured to obtain the service content based on the payload of the first message;

a determining unit 904, configured to determine, based on the service content, at least one solution used to implement the service content; and a sending unit 905, configured to send a second message to the application, where the second message includes a message header and a payload, the message header of the second message is used to identify that a message type of the second message is a response message, the payload of the second message includes solution information of the at least one solution, and the solution information includes a solution description of the at least one solution or a solution identifier corresponding to the at least one solution.

Optionally, the service content further includes constraint information and/or context information, the constraint information of the service content is used to identify a constraint condition for the service content, the context information of the service content is used to identify environment information for the service content, and the environment information includes any one or a combination of an application environment parameter, a network environment parameter, or an application scenario source.

Optionally, if the determining unit cannot determine, based on the service content, all solutions used to implement the service content, the determining unit is further configured to determine, based on the service content, to request the application to reply with the constraint condition for the service content and/or the environment information for the service content; and the payload of the second message further includes a constraint dimension item and/or a context requirement item, the constraint dimension item is used to request the application to reply with the constraint condition for the service content, and the context requirement item is used to request the application to reply with the environment information for the service content.

Optionally, the receiving unit is further configured to obtain a third message, where the third message includes a message header and a payload, the message header of the third message is used to identify that a message type of the third message is a request message, the payload of the third message includes supplementary content, the supplementary content includes constraint information and/or context information, the constraint information of the supplementary content includes the constraint condition for the service content, and the context information of the supplementary content includes the environment information for the service content;

the identification unit is further configured to identify, based on the message header of the third message, that the third message is a request message; and the obtaining unit is further configured to obtain the payload of the third message.

Optionally, if the payload of the third message does not include the service content, both the third message and the first message carry an object identifier used to identify the target object; and the method further includes:

when obtaining the first message, the receiving unit is further configured to store the service content and record the object identifier;

when obtaining the third message, the receiving unit is further configured to extract the stored service content based on the object identifier carried in the third message; and the determining unit is further configured to determine, based on the service content and the supplementary content, the at least one solution used to implement the service content; or if the payload of the third message further includes the service content, the determining unit is further configured to determine, based on the service content and the supplementary content, the at least one solution used to implement the service content.

Optionally, if the determining unit cannot determine, based on the service content, a solution used to implement the service content, the determining unit is further configured to determine, based on the service content, to request the application to reply with the constraint condition for the service content and/or the environment information for the service content; and the sending unit is further configured to send a fourth message to the application, where the fourth message includes a message header and a payload, the message header of the fourth message is used to identify that a message type of the fourth message is a response message, the payload of the fourth message includes a constraint dimension item and/or a context requirement item, the constraint dimension item is used to request the application to reply with the constraint condition for the service content, and the context requirement item is used to request the application to reply with the environment information for the service content.

Optionally, the receiving unit is further configured to obtain a third message, where the third message includes a message header and a payload, the message header of the third message is used to identify that a message type of the third message is a request message, the payload of the third message includes supplementary content, the supplementary content includes constraint information and/or context information, the constraint information of the supplementary content includes the constraint condition for the service content, and the context message of the supplementary content includes the environment information for the service content;

the identification unit is further configured to identify, based on the message header of the third message, that the third message is a request message; and the obtaining unit is further configured to obtain the payload of the third message.

Optionally, if the payload of the third message does not include the service content, both the third message and the first message carry an object identifier used to identify the target object;

when obtaining the first message, the receiving unit is further configured to store the service content and record the object identifier;

when obtaining the third message, the receiving unit is further configured to extract the stored service content based on the object identifier carried in the third message; and if the determining unit cannot determine, based on the service content, the solution used to implement the service content, the determining unit is further configured to determine, based on the supplementary content and the service content, to request the application to reply with the constraint condition for the service content and/or the environment information for the service content; or if the payload of the third message further includes the service content, and if the determining unit cannot determine, based on the service content, the solution used to implement the service content, the determining unit is further configured to determine, based on the supplementary content and the service content, to request the application to reply with the constraint condition for the service content and/or the environment information for the service content.

Optionally, the receiving unit is further configured to obtain a sixth message sent by the application, where the sixth message includes a message header and a payload, the message header of the sixth message is used to identify that a message type of the sixth message is a selection message, and the payload of the sixth message includes a target solution or a solution identifier of the target solution, where the target solution or the solution identifier of the target solution is selected by the application from the solution information of the at least one solution, or a solution identifier of the target solution;

the identification unit is further configured to identify, based on the message header of the sixth message, that the sixth message is a selection message;

the determining unit is further configured to determine an implementation result of the target solution based on the payload of the sixth message, where the implementation result is used to identify whether the target solution is implemented; and the sending unit is further configured to send a seventh message to the application for the sixth message, where the seventh message includes a message header and a payload, the message header of the seventh message is used to identify that a message type of the seventh message is a confirmation message, the payload of the seventh message includes the implementation result of the target solution, and the implementation result is used to identify whether the target solution is implemented.

It can be learned that, the type of the first message is defined by using the message header of the first message, and the payload of the first message carries the service content used to describe the service requirement, so that the application on an application plane may send, to the controller on a control plane by using the first message, the target object in the service requirement and the operation used to implement the service requirement on the target object. In addition, the type of the second message is defined by using the message header of the second message, and the payload of the second message carries the service content used to describe the service requirement. When receiving the second message sent by the controller, the application may identify and obtain the solution information of the at least one solution that is carried in the payload of the second message and that is used to implement the service content, so as to convert the service requirement into a control requirement between the application plane and the control plane.

Figure 10:
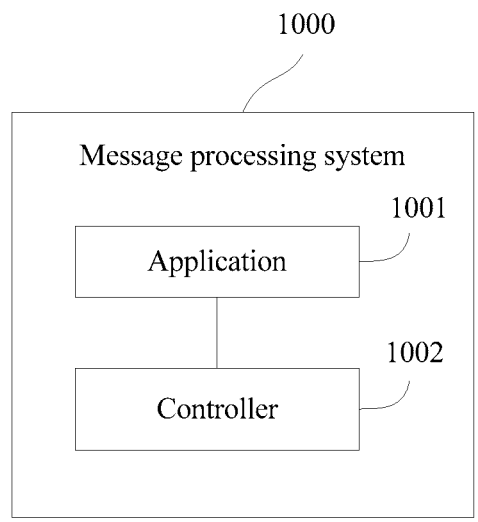
FIG. 10 is a structural diagram of a message processing system according to an embodiment of the present application.

FIG. 10 is a structural diagram of a message processing system 1000 according to an embodiment of the present application. The message processing system 1000 is applied to SDN, and includes an application and a controller.

The application 1001 is configured to: send a first message to the controller, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object; receive a second message sent by the controller, where the second message includes a message header and a payload, the message header of the second message is used to identify that a message type of the second message is a response message, the payload of the second message includes solution information of at least one solution used to implement the service content, and the solution information includes a solution description of the at least one solution or a solution identifier corresponding to the at least one solution; identify, based on the message header of the second message, that the second message is a response message; and obtain the solution information of the at least one solution based on the payload of the second message.

The controller 1002 is configured to: obtain the first message sent by the application; identify, based on the message header of the first message, that the first message is a request message; obtain the service content based on the payload of the first message; determine, based on the service content, the at least one solution used to implement the service content; and send the second message to the application.

Figure 11:
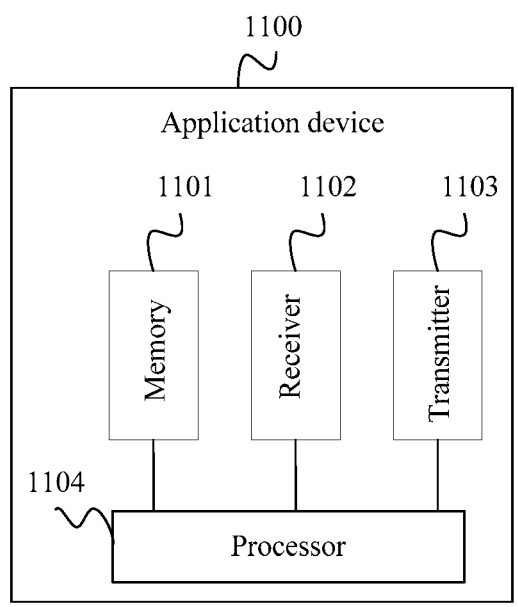
FIG. 11 is a hardware structural diagram of an application device according to an embodiment of the present application.

FIG. 11 is a hardware structural diagram of an application device 1100 according to an embodiment of the present application. The application device 1100 is located in SDN. An application is deployed in the application device. The application device performs the following operations by running the deployed application. The application device 1100 includes a memory 1101, a receiver 1102, a transmitter 1103, and a processor 1104 separately connected to the memory 1101, the receiver 1102, and the transmitter 1103. The memory 1101 is configured to store a group of program instructions. The processor 1104 is configured to invoke the program instructions stored in the memory 1101, to perform the following operations:

triggering the transmitter 1103 to send a first message to a controller, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object;

triggering the receiver 1102 to receive a second message sent by the controller, where the second message includes a message header and a payload, the message header of the second message is used to identify that a message type of the second message is a response message, the payload of the second message includes solution information of at least one solution used to implement the service content, and the solution information includes a solution description of the at least one solution or a solution identifier corresponding to the at least one solution;

identifying, based on the message header of the second message, that the second message is a response message; and obtaining the solution information of the at least one solution based on the payload of the second message.

Optionally, the processor 1104 may be a central processing unit (CPU), the memory 1101 may be an internal memory of a random access memory (RAM) type, the receiver 1102 and the transmitter 1103 may include a general physical interface, and the physical interface may be an Ethernet interface or an asynchronous transfer mode (ATM) interface. The processor 1104, the transmitter 1103, the receiver 1102, and the memory 1101 may be integrated into one or more independent circuits or hardware, for example, an application-specific integrated circuit (ASIC).

Figure 12:
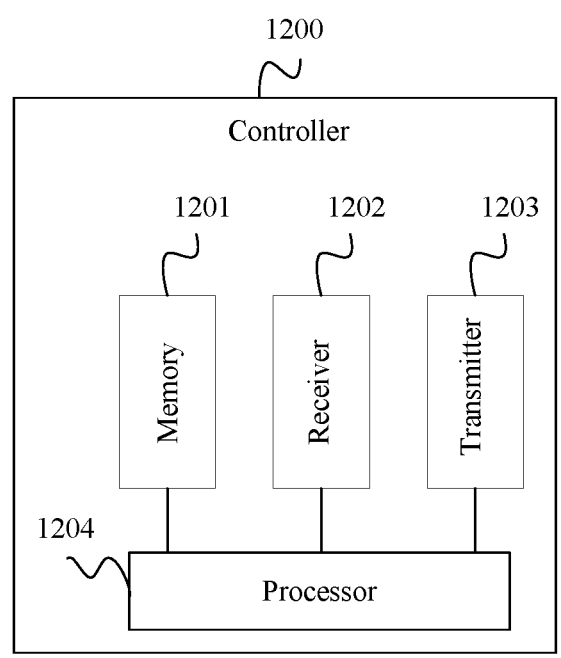
FIG. 12 is a hardware structural diagram of a controller according to an embodiment of the present application.

FIG. 12 is a hardware structural diagram of a controller 1200 according to an embodiment of the present application. The controller 1200 is located in SDN. The controller 1200 includes a memory 1201, a receiver 1202, a transmitter 1203, and a processor 1204 separately connected to the memory 1201, the receiver 1202, and the transmitter 1203. The memory 1201 is configured to store a group of program instructions, and the processor 1204 is configured to invoke the program instructions stored in the memory 1201, to perform the following operations:

triggering the receiver 1202 to obtain a first message sent by an application, where the first message includes a message header and a payload, the message header of the first message is used to identify that a message type of the first message is a request message, the payload of the first message includes service content used to describe a service requirement, the service content includes target information and operation information, the target information is used to identify a target object, and the operation information is used to identify an operation used to implement the service requirement on the target object;

identifying, based on the message header of the first message, that the first message is a request message;

obtaining the service content based on the payload of the first message;

determining at least one solution of the service content based on the service content; and triggering the transmitter 1203 to send a second message to the application, where the second message includes a message header and a payload, the message header of the second message is used to identify that a message type of the second message is a response message, the payload of the second message includes solution information of the at least one solution, and the solution information includes a solution description of the at least one solution or a solution identifier corresponding to the at least one solution.

Optionally, the processor 1204 may be a CPU, the memory 1201 may be an internal memory of a RAM type, the receiver 1202 and the transmitter 1203 may include a general physical interface, and the physical interface may be an Ethernet interface or an ATM interface. The processor 1204, the transmitter 1203, the receiver 1202, and the memory 1201 may be integrated into one or more independent circuits or hardware, for example, an ASIC.

The general purpose processor may be a microprocessor, or the processor may be any conventional processor, decoder, or the like. The steps of the method disclosed with reference to the embodiments of the present application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register.

"First" in the first message and the first supplementary content mentioned in the embodiments of the present application is used only for name identification, and does not mean being the first in sequence. This rule is also applicable to the word "second", "third", and the like.

A person of ordinary skill in the art may understand that all or a part of the steps in the method embodiments may be implemented by a program instructing relevant hardware. The program may be stored in a computer readable storage medium. When the program runs, the steps in the method embodiments are performed. The storage medium may be at least one of the following media: media that are capable of storing program code, such as a read-only memory (ROM), a RAM, a magnetic disk, or a compact disc.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to partial descriptions in the method embodiment. The described device and system embodiments are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present application without creative efforts.

The foregoing descriptions are merely preferable specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A message processing method, applied to software-defined networking (SDN), the method comprising:

sending, by an application, a first message to a controller, wherein the first message comprises a message header and a payload, the message header of the first message is used to identify that a message type of the first message is a request message, the payload of the first message comprises service content used to describe a service requirement, the service content comprises target information and operation information, the target information is used to identify a target object, and the operation information is used to identify an operation used to implement the service requirement on the target object;

receiving, by the application, a second message sent by the controller, wherein the second message comprises a message header and a payload, the message header of the second message is used to identify that a message type of the second message is a response message, the payload of the second message comprises solution information of at least one solution used to implement the service content, and the solution information comprises at least one of a solution description of the at least one solution and a solution identifier corresponding to the at least one solution;

identifying, by the application based on the message header of the second message, that the second message is a response message; and obtaining, by the application, the solution information of the at least one solution based on the payload of the second message.

2. The method according to claim 1, wherein the service content further comprises at least one of constraint information and context information, the constraint information of the service content is used to identify a constraint condition for the service content, the context information of the service content is used to identify environment information for the service content, and the environment information comprises at least one of an application environment parameter, a network environment parameter, and an application scenario source.

3. The method according to claim 1, wherein the payload of the second message further comprises at least one of a constraint dimension item and a context requirement item, the constraint dimension item is used to request the application to reply with the constraint condition for the service content, and the context requirement item is used to request the application to reply with the environment information for the service content; and the obtaining, by the application, the solution information of the at least one solution based on the payload of the second message comprises:

obtaining, by the application based on the payload of the second message, at least one of the constraint dimension item and the context requirement item in the second message, and obtaining the solution information of the at least one solution in the second message.

4. The method according to claim 3, wherein the method further comprises:

determining, by the application, first supplementary content based on at least one of the constraint dimension item and the context requirement item in the second message; and sending, by the application, a third message to the controller, wherein the third message comprises a message header and a payload, the message header of the third message is used to identify that a message type of the third message is a request message, the payload of the third message comprises the first supplementary content, and if the payload of the second message comprises the constraint dimension item, the first supplementary content comprises a constraint condition required in the constraint dimension item of the second message; and if the payload of the second message comprises the context requirement item, the first supplementary content comprises environment information required in the context requirement item of the second message.

5. The method according to claim 4, wherein if the payload of the third message does not comprise the service content, both the third message and the first message carry an object identifier used to identify the target object; and if the payload of the third message does comprise the service content, the payload of the third message comprises the service content and the first supplementary content.

6. The method according to claim 1, wherein after the sending, by an application, a first message to a controller and before the receiving, by the application, a second message sent by the controller, the method further comprises:

receiving, by the application, a fourth message sent by the controller, wherein the fourth message comprises a message header and a payload, the message header of the fourth message is used to identify that a message type of the fourth message is a response message, and the payload of the fourth message comprises at least one of a constraint dimension item and a context requirement item;

identifying, by the application based on the message header of the fourth message, that the fourth message is a response message;

obtaining, by the application based on the payload of the fourth message, at least one of the constraint dimension item and the context requirement item comprised in the fourth message;

determining, by the application, at least one of the second supplementary content based on the constraint dimension item and the context requirement item comprised in the fourth message; and sending, by the application, a fifth message to the controller, wherein the fifth message comprises a message header and a payload, the message header of the fifth message is used to identify that a message type of the fifth message is a request message, the payload of the fifth message comprises the second supplementary content, and if the payload of the fourth message comprises the constraint dimension item, the second supplementary content comprises a constraint condition required in the constraint dimension item of the fourth message; and if the payload of the fourth message comprises the context requirement item, the second supplementary content comprises environment information required in the context requirement item of the fourth message.

7. The method according to claim 1, wherein after the obtaining, by the application, the solution information of the at least one solution based on the payload of the second message, the method further comprises:

sending, by the application, a sixth message to the controller, wherein the sixth message comprises a message header and a payload, the message header of the sixth message is used to identify that a message type of the sixth message is a selection message, and the payload of the sixth message comprises a target solution or a solution identifier of the target solution, wherein the target solution or the solution identifier of the target solution is selected by the application from the solution information of the at least one solution; and receiving, by the application, a seventh message sent by the controller for the sixth message, wherein the seventh message comprises a message header and a payload, the message header of the seventh message is used to identify that a message type of the seventh message is a confirmation message, the payload of the seventh message comprises an implementation result of the target solution, and the implementation result is used to identify whether the target solution is implemented.

8. A message processing apparatus for software-defined networking (SDN), the apparatus comprising:

a non-transitory memory storing instructions; and a processor coupled to the non-transitory memory; wherein the instructions, when executed by the processor, cause the apparatus to:

send a first message to a controller, wherein the first message comprises a message header and a payload, the message header of the first message is used to identify that a message type of the first message is a request message, the payload of the first message comprises service content used to describe a service requirement, the service content comprises target information and operation information, the target information is used to identify a target object, and the operation information is used to identify an operation used to implement the service requirement on the target object;

receive a second message sent by the controller, wherein the second message comprises a message header and a payload, the message header of the second message is used to identify that a message type of the second message is a response message, the payload of the second message comprises solution information of at least one solution used to implement the service content, and the solution information comprises at least one of a solution description of the at least one solution and a solution identifier corresponding to the at least one solution;

identify, based on the message header of the second message, that the second message is a response message; and obtain the solution information of the at least one solution based on the payload of the second message.

9. The apparatus according to claim 8, wherein the service content further comprises at least one of constraint information and context information, the constraint information of the service content is used to identify a constraint condition for the service content, the context information of the service content is used to identify environment information for the service content, and the environment information comprises at least one of an application environment parameter, a network environment parameter, and an application scenario source.

10. The apparatus according to claim 8, wherein the payload of the second message further comprises at least one of a constraint dimension item and a context requirement item, the constraint dimension item is used to request the application to reply with the constraint condition for the service content, and the context requirement item is used to request the application to reply with the environment information for the service content; wherein the instructions, when executed by the processor, further cause the apparatus to be configured to:

obtain, based on the payload of the second message, at least one of the constraint dimension item and the context requirement item comprised in the second message, and obtain the solution information of the at least one solution comprised in the second message.

11. The apparatus according to claim 10, wherein instructions, when executed by the processor, further cause the apparatus:
determine first supplementary content based on at least one of the constraint dimension item and the context requirement item comprised in the second message; and
send a third message to the controller, wherein the third message comprises a message header and a payload, the message header of the third message is used to identify that a message type of the third message is a request message, the payload of the third message comprises the first supplementary content, and if the payload of the second message comprises the constraint dimension item, the first supplementary content comprises a constraint condition required in the constraint dimension item of the second message; and if the payload of the second message comprises the context requirement item, the first supplementary content comprises environment information required in the context requirement item of the second message.

12. The apparatus according to claim 11, wherein
if the payload of the third message does not comprise the service content, both the third message and the first message carry an object identifier used to identify the target object; and
if the payload of the third message does comprise the service content, the payload of the third message comprises the service content and the first supplementary content.

13. The apparatus according to claim 8, wherein the instructions, when executed by the processor, further cause the apparatus:
receive a fourth message sent by the controller, wherein the fourth message comprises a message header and a payload, the message header of the fourth message is used to identify that a message type of the fourth message is a response message, and the payload of the fourth message comprises at least one of a constraint dimension item and a context requirement item;
identify, based on the message header of the fourth message, that the fourth message is a response message;
obtain, based on the payload of the fourth message, at least one of the constraint dimension item and the context requirement item comprised in the fourth message;
determine at least one of the second supplementary content based on the constraint dimension item and the context requirement item comprised in the fourth message; and
send a fifth message to the controller, wherein the fifth message comprises a message header and a payload, the message header of the fifth message is used to identify that a message type of the fifth message is a request message, the payload of the fifth message comprises the second supplementary content, and if the payload of the fourth message comprises the constraint dimension item, the second supplementary content comprises a constraint condition required in the constraint dimension item of the fourth message; and if the payload of the fourth message comprises the context requirement item, the second supplementary content comprises environment information required in the context requirement item of the fourth message.

14. The apparatus according to claim 8, wherein the instructions, when executed by the processor, further cause the apparatus to be configured to:
send a sixth message to the controller, wherein the sixth message comprises a message header and a payload, the message header of the sixth message is used to identify that a message type of the sixth message is a selection message, and the payload of the sixth message comprises a target solution or a solution identifier of the target solution, wherein the target solution or the solution identifier of the target solution is selected by the application from the solution information of the at least one solution; and
receive a seventh message sent by the controller for the sixth message, wherein the seventh message comprises a message header and a payload, the message header of the seventh message is used to identify that a message type of the seventh message is a confirmation message, the payload of the seventh message comprises an implementation result of the target solution, and the implementation result is used to identify whether the target solution is implemented.

15. A message processing apparatus, for software-defined networking (SDN), the apparatus comprising:
a non-transitory memory storing instructions; and
a processor coupled to the non-transitory memory; wherein the instructions, when executed by the processor, cause the apparatus to be configured to:
obtain a first message sent by an application, wherein the first message comprises a message header and a payload, the message header of the first message is used to identify that a message type of the first message is a request message, the payload of the first message comprises service content used to describe a service requirement, the service content comprises target information and operation information, the target information is used to identify a target object, and the operation information is used to identify an operation used to implement the service requirement on the target object;
identify, based on the message header of the first message, that the first message is a request message;
obtain the service content based on the payload of the first message;
determine, based on the service content, at least one solution used to implement the service content; and
send a second message to the application, wherein the second message comprises a message header and a payload, the message header of the second message is used to identify that a message type of the second message is a response message, the payload of the second message comprises solution information of the at least one solution, and the solution information comprises at least one of a solution description of the at least one solution and a solution identifier corresponding to the at least one solution.

16. The apparatus according to claim 15, wherein the service content further comprises at least one of constraint information and context information, the constraint information of the service content is used to identify a constraint condition for the service content, the context information of the service content is used to identify environment information for the service content, and the environment information comprises at least one of an application environment parameter, a network environment parameter, and an application scenario source.

17. The apparatus according to claim 15, wherein the instructions, when executed by the processor, further cause the apparatus to determine, based on at least one of the service content, to request the application to reply with the constraint condition for the service content and the environment information for the service content, if the apparatus cannot determine, based on the service content, all solutions used to implement the service content; and the payload of the second message further comprises at least one of a constraint dimension item and a context requirement item, the constraint dimension item is used to request the application to reply with the constraint condition for the service content, and the context requirement item is used to request the application to reply with the environment information for the service content.

18. The apparatus according to claim 17, wherein the instructions, when executed by the processor, further cause the apparatus to:

obtain a third message, wherein the third message comprises a message header and a payload, the message header of the third message is used to identify that a message type of the third message is a request message, the payload of the third message comprises supplementary content, the supplementary content comprises constraint information and/or context information, the constraint information of the supplementary content comprises the constraint condition for the service content, and the context information of the supplementary content comprises the environment information for the service content;

identify, based on the message header of the third message, that the third message is a request message; and obtain the payload of the third message.

19. The apparatus according to claim 18, wherein if the payload of the third message does not comprise the service content, both the third message and the first message carry an object identifier used to identify the target object; wherein the instructions, when executed by the processor, further cause the apparatus to:

store the service content and record the object identifier, when obtaining the first message;

extract the stored service content based on the object identifier carried in the third message, when obtaining the third message; and determine, based on the service content and the supplementary content, the at least one solution used to implement the service content; or determine, based on the service content and the supplementary content, the at least one solution used to implement the service content, if the payload of the third message further comprises the service content.

20. The apparatus according to claim 15, wherein the instructions, when executed by the processor, further cause the apparatus to:

determine, based on at least one of the service content, to request the application to reply with the constraint condition for the service content and the environment information for the service content, if the apparatus cannot determine, based on the service content, a solution used to implement the service content; and send a fourth message to the application, wherein the fourth message comprises a message header and a payload, the message header of the fourth message is used to identify that a message type of the fourth message is a response message, the payload of the fourth message comprises at least one of a constraint dimension item and a context requirement item, the constraint dimension item is used to request the application to reply with the constraint condition for the service content, and the context requirement item is used to request the application to reply with the environment information for the service content.

* * * * *